United States Patent [19]

Yoshida

[11] Patent Number: 5,761,470
[45] Date of Patent: Jun. 2, 1998

[54] DATA PROCESSOR HAVING AN INSTRUCTION DECODER AND A PLURALITY OF EXECUTING UNITS FOR PERFORMING A PLURALITY OF OPERATIONS IN PARALLEL

[75] Inventor: Toyohiko Yoshida, Tokyo, Japan

[73] Assignee: Mitsubishi Denki Kabushiki Kaisha, Tokyo, Japan

[21] Appl. No.: 574,283

[22] Filed: Dec. 18, 1995

[30] Foreign Application Priority Data

Jul. 12, 1995 [JP] Japan ................................. 7-176380

[51] Int. Cl.[6] .................................................. G06F 9/30
[52] U.S. Cl. .................................. 395/386; 395/384
[58] Field of Search ................................ 395/386, 384

[56] References Cited

U.S. PATENT DOCUMENTS

| | | | |
|---|---|---|---|
| 4,954,943 | 9/1990 | Kawasaki et al. | 395/386 |
| 5,202,967 | 4/1993 | Matsuzaki et al. | 395/386 |
| 5,321,821 | 6/1994 | Itomitsu et al. | 395/386 |
| 5,371,864 | 12/1994 | Chuang | 395/386 |
| 5,488,710 | 1/1996 | Sato et al. | 395/452 |

OTHER PUBLICATIONS

Sohi; "Instruction Issue Logic for high-performance, Interruptable pipelined processors"; pp. 27–34.

B. Ramakrishna Rau et al. "Instruction-Level Parallel Processing: History, Overview, and Perspective", *The Journal of Supercomputing*, vol. 7, No. 1/2, 1993.

The TORCHers, "TORCH Architectural Specification", Version 1.1, Jun. 10, 1991.

*Primary Examiner*—Krisna Lim
*Attorney, Agent, or Firm*—Burns, Doane, Swecker & Mathis, LLP

[57] ABSTRACT

In a data processor, using a format field which specifies the number of operation fields of an instruction code and all order of execution of operations, the number of operations and the order of operation executions are flexibly controlled and the necessity of a null operation is reduced, and decoders operate in parallel each decoding only one operation having a specific function which has a dependency on an operation execution mechanism, so that the operation fields of the instruction code are decoded in parallel by a number of decoders. While the data processor is basically a VLIW type data processor, more types of operations can be specified by the operation fields, and coding efficiency of instructions is improved since the number of operation fields and the order of operation executions are flexibly controlled and the necessity of a null operation is reduced by means of the format field which specifies the number of the operation and the order of the operation executions.

18 Claims, 27 Drawing Sheets

FIG. 2

| code:format | orders to be issued | | |
|---|---|---|---|
| | operation_0 | operation_1 | operation_2 |
| FM=0000:2-ops. | 1st | 1st | — |
| FM=0001:2-ops. | 1st | 2nd | — |
| FM=0010:2-ops. | 2nd | 1st | — |
| FM=0011:3-ops. | 1st | 1st | 1st |
| FM=0100:3-ops. | 1st | 1st | 2nd |
| FM=0101:3-ops. | 1st | 2nd | 1st |
| FM=0110:3-ops. | 1st | 2nd | 2nd |
| FM=0111:3-ops. | 2nd | 2nd | 2nd |
| FM=1000:3-ops. | 2nd | 2nd | 3rd |
| FM=1001:3-ops. | 2nd | 3rd | 2nd |
| FM=1010:3-ops. | 2nd | 1st | 1st |
| FM=1011:3-ops. | 2nd | 1st | 2nd |
| FM=1100:3-ops. | 2nd | 2nd | 3rd |
| FM=1101:3-ops. | 2nd | 3rd | 1st |
| FM=1110:3-ops. | 3rd | 1st | 2nd |
| FM=1111:3-ops. | 3rd | 2nd | 1st |

FIG. 4

| | | | | | | |
|---|---|---|---|---|---|---|
| LB | <cond> 204 | 000000 631 | x 32 | <disp:29> 63 | | 71 |
| LM-1 | <cond> 204 | 100xxx 634 | <Rb> 535 | <Ra> 536 | xx 237 | <disp:18> pc+sl disp 33 | 72 |
| LM-2 | <cond> 204 | 000100 639 | <sop> 540 | <Ra> 536 | <ea> 241 | @(Rb+sl disp) 38 <disp:18> <Rd> <Rc> 8 43 44 45 | 73 |
| LI-R | <cond> 204 | 010000 646 | <Rb> 547 | <Ra> 548 | <sop> 449 | <exp:16> 50 | 74 |
| LR-R | <cond> 204 | 001000 651 | <Rb> 547 | <Ra> 548 | ... 452 | <xop> <Rd> <Rc> 653 554 555 | 75 |
| LR-C | <cond> 204 | 00101 556 | <cc><Fd> 357 358 | <Ra> 548 | <Fs> 459 | <xop> ... <Rc> 653 560 555 | 76 |
| LI-C | <cond> 204 | 011xx 561 | <cc><Fd> 357 358 | <Ra> 548 | <Fs> 459 | <exp:16> 62 | 77 |
| MISC | <cond> 204 | 0011·· 663 | <Rb> 547 | <Ra> 548 | ... 452 | MISC 11 64 <Rc> 555 | 78 |

FIG. 5

```
<ea>=00:@(PC+s‖disp)
    =01:@(PC+Rc)
    =10:@(PC+Rd)
    =11:pop,push
```

FIG. 6

```
<cc>=000:equal
    =001:not equal
    =010:greater than
    =011:less than or equal
    =100:less than
    =101:greater than or equal
    =110:always or ordered
    =111:never or unordered
```

FIG. 12

```
C=0.0
DO K=1,N
    C=C+A(K)* B(K)
END DO
```

FIG. 13

```
303~FLD    @(disp4,R29),FR1  1C0F;load C=0.0 to FR1  ⎫
304~LDI    #1,R1             1C0F;load K=1 to R1     ⎬ 301
                   313
           314
     LDW2  @(disp1,R29),R2   1C0F;load the address of A(1) and B(1) to R2:3
     NOP                     1C0F
305  LD    @(disp3,R29),R4   1C0F;load N to R4
     NOP                     1C0F
                                                     ⎫
  L1:FLD   @(R2),FR2         1C0F;load A(K) to FR2   ⎪
306~ADDI   #1,R1             1C0F;K=K+1              ⎪
307~ADDI   #4,R2             1C0F;increment the address of A()
                                                     ⎬ 302
     FLD   @(R3),FR3         1C0F;load B(K) to FR3   ⎪
     ADDI  #4,R3             1C0F;increment the address of B()
     CMP   R1,R4             1C0F;if K=N set F3      ⎪
                                                     ⎪
     FMAL  FR2,FR3,FR1       1C0F;C=A(K)*B(K)+C      ⎪
     BRA   L1                1C3F;branch to L1(if F3=10)  ⎭
```

FIG. 14

```
      LD    @(disp3,R29),R2    1C0F;load N to R2
      SHL   #2,R2              2C0F;R4=4*N LD    @(disp1,R29),R1    1C0F;load the address of A(1) to R1
      NEG   R2,R2              1C0F;R2=-4*N LD    @(disp2,R29),R3    1C0F;load the address of B(1) to R3
      NEG   R2,R1              1C0F;R1 = the address of A(1)-R2

308   FLD   @(disp4,R29),FR8   1C0F;load C=0.0 to FR18
      SUB   R2,R3              1C0F;R3 = the address of B(1)-R2

L1:FLD4  @(R1,R2),FR0       1C0F;load A(K),A(K+1),A(K+2),and A(K+3) to FR0:3
      NOP                      1C0F;1

309   FLD4  @(R2,R3),FR3       1C0F;load B(K),B(K+1),B(K+2),and B(K+3) to FR4:7
      ADDI  #4,R2              1C0F;R2=R2+4,and effect F5:7 depending on the result FMAL  FR0,FR4,FR8        1C6T;C=C+A(K)*B(K)(if R2=<0)
      ADDI  #4,R2              1C6F;R2=R2+4,and effect F5:7(if R2=<0)

FMAL  FR1,FR5,FR8        1C6F;C=C+A(K+1)*B(K+1)(if R2=<0)
      ADDI  #4,R2              1C6F;R2=R2+4,and effect F5:7(if R2=<0)

FMAL  FR2,FR6,FR8        1C6F;C=C+A(K+2)*B(K+2)(if R2=<0)
      ADDI  #4,R2              1C6F;R2=R2+4,and effect F5:7(if R2=<0)

FMAL  FR3,FR7,FR8        1C6F;C=C+A(K+3)*B(K+3)(if R2=<0)
      BRA   L1                 1C5T;branch(if R2=<0)
```

FIG. 15

```
I=0.0
DO K=1,N
    IF(X(K).GT.XLIMIT)I=I+1
END DO
```

FIG. 16

```
        LD    @(disp1,R29),R2   1C0F; load the address of X(1) to R2
        LDI   #1,R1             1C0F; load K=1 to R1

FLD   @(disp2,R29),FR3  1C0F; load XLIMIT to FR3
        MOV   R0,R3             1C0F; load I=0 to R3

LD    @(disp3,R29),R4   1C0F; load N to R4
        NOP                     1C0F;

L1: FLD   @(R2),FR2         1C0F; load X(K) to FR2
        ADDI  #1,R1             1C0F; K=K+1
        ADDI  #4,R2             1C0F; increment the address of X()

326~    FCGT  FR2,FR3,F4        1C4T; I=I+1(if F4=11)
327~    CMP   R1,R4             1C3F; branch to L1(if F3=10)  ⎫
                                                              ⎬ 320
321~    ADDI  #1,R3             1C0F;                         ⎭
323~    BRA   L1                322~
325~    NOP                     324~
```

FIG. 17

```
PtrParIn->IntComp=5;
NextRecord.IntComp=PtrParIn->IntComp;
NextRecord.PtrComp=PtrParIn->PtrComp;
Proc3(NextRecord.PtrComp);
If(NextRecord.Discr==Ident1)
{
------
}
else
{
------
{
```

FIG. 18

```
        LDI    #5,R1                    1C0F; load #5 to R1
        LDW    @R13,R2                  1C0F; load the address of NextRecord to R2
        LDW    @R13,R3                  2C0F; load PtrParIn->PtrComp to R3
                                                                                    ⎫
331 ~  STW    R1,@(displ,R13)          1C0F; PtrParIn->IntComp=#5                  │
333 ~  STW    R1,@(displ,R2)           2C0F; NextRecord.IntComp=PtrParIn->IntComp  ⎬ 330
335 ~  STW    R3,@R2                   3C0F; NextRecord.IntComp=PtrParIn->IntComp  │
                                                                                    ⎭

MOV    R3,R24                   1C0F; set argument NextRecord.PtrComp
        STW    R30,@-SP                 1C0F; save the return address
        BSR    pcadr                    1C0F; call Proc3
                                                                                    ⎫
341 ~  LDW    @(disp2,R2),R1           1C0F; load NextRecord.Discr                 │
343 ~  CMP    R0,R1                    2C0F; if NextRecord.Discr=0 set F3          ⎬ 340
345 ~  BRA    label_1                  3C3F; branch to label_1 (if F3=10)          │
                                                                                    ⎭
332
334
336
342
344
346
```

FIG. 19

```
for(i=0; i<ninputs; i++){
   aa=a[0]->ptand[i];
   bb=b[0]->ptand[i];
   if(aa==2)
      aa=0;
   if(bb==2)
      bb=0;
   if(aa!=bb){
      if(aa<bb)
         return-1;
      else
         return 1;
   }
}
```

FIG. 20

```
350~  IFG                          ;C0F;initialize flags(F0=10,the others=00)
      NOP                          ;C0F;

LDW2  @(disp1,R29),R1        ;C0F;load pointers to R1:2
      MOV   R0,R5                  ;C0F;load i=0 to R5

LD    @(disp2,R29),R2        ;C0F;load ninput to R6
      NOP                          ;C0F;

L1:LDH  @(R1),R3                ;C0F;load aa to R3
309{  ADDI  #2,R1                  ;C0F;Increment the address of a[0]->ptand[1]
      ADDI  #1,R5                  ;C0F;increment i LDH   @(R2),R4               ;C0F;load bb to R4
      CIEQ  #2,R3,F4               ;C1T;if aa=2 set F4

CIEQ  #2,R4,F5               ;C0F;if BB=2 set F5
      ADDI  #2,R2                  ;C0F;Increment the address of b[0]->ptand[1]

CMP   R5,R6                  ;C0F;if I<ninput set F1
      MOV   R0,R3                  ;C1T;aa=0(if F1=11)
      MOV   R0,R4                  ;C2T;bb=0(if F2=11)

351~  CNE   R3,R4,R6               ;C0F;if aa!=bb set F6
      NOP                          ;C0F;

352~  CLT   R3,R4,R7               ;C0F;if aa<bb set F7 else reset F7(if F6=11)
      NOP                          ;C0F;

353~  LDI   #-1,R15                ;C7T;load#-1 to R15(if F7=11)
354~  LDI   #1,R15                 ;C7F;load#1 to R15(if F7=10)
355~  JMP   @(R30)                 ;C6T;return(if F6=11)

BRA   L1                     ;C1T;branch to L1(if F1=11)
      IFG                          ;C0F;initialize flags(F0=00,the others=00)
      NOP                          ;C0F;
```

FIG. 22

```
      code:format          orders to be issued
                         operation_0  operation_1
    FM=00:1-op               1st         ---
    FM=01:2-ops.             1st         1st
    FM=10:2-ops.             1st         2nd
    FM=11:2-ops.             2nd         1st
```

FIG. 26

```
        code:format     orders to be issued
                        operation_0 operation_1
   FM=1-    : 1-op.     1st            ...
      00    : 2-ops.    1st            2nd
      01    : 2-ops.    1st            1st
```

DATA PROCESSOR HAVING AN INSTRUCTION DECODER AND A PLURALITY OF EXECUTING UNITS FOR PERFORMING A PLURALITY OF OPERATIONS IN PARALLEL

BACKGROUND OF THE INVENTION

1. Field of the Invention

The present invention relates to a data processor for performing a plurality of operations in parallel, and more particularly to a data processor for performing a plurality of operations in parallel at a high efficiency by executing a so-called VLIW (Very Long Instruction Word) type instruction which specifies a plurality of operations by one instruction.

2. Description of Related Art

As a data processor for performing operations at a high speed utilizing parallelism of instruction levels, data processors adopting superscalar type or VLIW type parallel operation techniques have been already proposed. So-called superscalar is a parallel operation technique in which parallelism of instruction levels is detected by hardware from an instruction stream and a plurality of instructions are then executed in parallel.

On the other hand, the VLIW technique is a parallel operation technique in which one instruction consists of a plurality of parallel executable operations which are detected and en-coded by a compiler at compiling time. A plurality of operations which are specified by this long instruction word are executed in parallel. These types of conventional data processors are described in detail in "Instruction-Level Parallelism", B. R. Rau and J. A. Fisher, The Journal of Supercomputing, Vol. 7, No. 1/2, 1993, for example.

The conventional superscalar type data processor is advantageous in being capable of executing instructions that were generated in the past without translating. However, since the number of instructions which are executable in parallel is not constant, it is necessary to specify instructions which are executable in parallel or to align instructions which are to be inputted to an instruction decoder in accordance with the number of instructions which are executable in parallel. This imposes al large load on the decoder hardware.

Further, since the conventional VLIW type data processor guarantees that instructions have the same length and all of a plurality of operations which are described within one instruction can be executed in parallel, the problem of an increased load on the decoder hardware is not generated, unlike in the conventional superscalar type data processor as mentioned above. However, since the conventional VLIW type data processor consumes one instruction even when there are no operations which can be executed in parallel, a number of operation fields specifying null operations (No Operation: NOP) are generated, whereby the amount of instruction code becomes very big. In addition, in the conventional VLIW type data processor, types of operations which can be specified by respective operation fields are limited to simplify the instruction decoder and the operation mechanism. Because of the standardized method of specifying operation, flexibility of assigning operations within one instruction is small, and therefore the instruction code efficiency is poor.

SUMMARY OF THE INVENTION

The present invention has been made to overcome these disadvantages of the prior art as mentioned above. The present invention therefore aims to obtain a data processor which is basically of the VLIW type but achieves an improved instruction code efficiency, in which the necessity of specifying null operations is reduced by flexibly controlling the number and the order of operations, using a format field which specifies the number of the operation fields and the order of the operations. At the same time, decoders decode only operations of specific functions depending on executing mechanisms in parallel. With decoding the respective operation fields by a number of simple decoders, the present invention increases the number of operations which can be specified by the respective operation fields.

A data processor according to the present invention comprises: an instruction decoder for decoding an instruction code consisting at least one operation field which specifies the type of an operation to be executed and a format field which specifies the number of the operation fields and outputting control signals; and a plurality of operating means which are connected to the instruction decoder for executing the instruction in accordance with the control signals outputted from the instruction decoder. In the data processor, when the instruction decoder decodes a first instruction code which includes a first number of operation fields, the instruction decoder outputs a first set of control signals, and the plurality of operating means execute the first number of operations in accordance with the first set of control signals, and when the instruction decoder decodes a second instruction code which includes a second number of operation fields and has the same code length with the first instruction code, the second number being different from the first number, the instruction decoder outputs a second set of control signals different from the first set of control signals, and the plurality of operating means execute the second number of operations in accordance with the second set of control signals.

A data processor according to the present invention comprises: an instruction decoder for decoding an instruction code; a control unit which is connected to the instruction decoder to output control signals in accordance with decoded results by the instruction decoder; and first operating means and second operating means which are connected to the instruction decoder for executing an instruction in accordance with the control signals outputted from the control unit. In the data processor, when the instruction decoder decodes an instruction code which consists of at least a first operation field and a second operation field, each specifying an operation to be executed, and a format field which specifies the number of operation fields and the order of executing operations specified by the operation fields, the control unit outputs a first control signal and a second control signal in accordance with the order of executing operations specified by the format field and operation types specified by the first operation field and the second operation field, the first operating means executes the first operation in accordance with the first control signal, and the second operating means executes the second operation in accordance with the second control signal.

In the data processor having the configuration as mentioned above, when the instruction decoder decodes a first instruction code in which sequential execution of the first operation specified by the first operation field and the second operation specified by second operation field is specified by the format field, the instruction decoder outputs a first decoded result while the control unit outputs the first control signal at a first time point and then outputs the second control signal at a second time point in accordance with the first decoded result, so that the first operating means executes the first operation in accordance 3with the first control signal and the second operating means thereafter executes the second operation in accordance with the second control signal, and when the instruction decoder decodes a second instruction code in which simultaneous execution of a third operation specified by the first operation field and a fourth operation specified by the second operation field is specified by the format field, the instruction decoder outputs a second decoded result while the control unit outputs a third control signal and a fourth control signal at the same time in accordance with the second decoded result, so that the first operating means and the second operating means simultaneously execute the third operation and the fourth operation in accordance with the third control signal and the fourth control signal, respectively.

A data processor according to the present invention comprises: a first decoder for decoding a predetermined field of an instruction code and outputting a control signal; a first operation execution unit which is connected to the first decoder to operate in accordance with the control signal outputted from the first decoder; a second decoder for decoding the predetermined field and outputting a control signal; and a second operation execution unit which is connected to the second decoder to operate in accordance with the control signal outputted from the second decoder. In the data processor, when a first instruction code in which a first type of operation is specified by the predetermined field is decoded, the first and the second decoders decode the predetermined field at the same time, the first decoder outputs a first control signal while the second decoder outputs a second control signal different from the first control signal, the first operation execution unit executes a first operation in accordance with the first control signal, the second operation execution unit executes no operation in accordance with the second control signal, and when a second instruction code in which a second type of operation is specified by the predetermined field is decoded, the first and the second decoders decode the predetermined field at the same time, the first decoder outputs a third control signal while the second decoder outputs a fourth control signal which is different from the third control signal, the first operation execution unit executes no operation in accordance with the third control signal, the second operation execution unit executes a second operation in accordance with the fourth control signal.

A data processor according to the present invention comprises: a first decoder for decoding a first operation field of an instruction code and outputting a first control signal; a second decoder for decoding a second operation field different from the first operation field and outputting a second control signal; an output processing unit which is connected to the first and the second decoders to input both the first and the second control signals and selectively outputs one of the first and the second control signals; and an operation execution unit which is connected to the output processing unit to operate in accordance with a control signal outputted from the output processing unit. In the data processor, when a first instruction code in which a first operation is specified by the first operation field and a second operation is specified by the second operation field is decoded, the first decoder decodes the first operation field and the second decoder decodes the second operation field at the same a time, the first decoder outputs the first control signal and the second decoder outputs the second control signal, and the output processing unit selectively outputs the first control signal to the operation execution unit, and when a second instruction code in which a third operation is specified by the first operation field and the first operation is specified by the second operation field is decoded, the first decoder decodes the first operation field and the second decoder decodes the second operation field at the same time, the first decoder outputs a third control signal and the second decoder outputs a fourth control signal, and the output processing unit selectively outputs the fourth control signal to the operation execution unit, whereby the operation execution unit executes the first operation both when the first operation is specified by the first operation field and when the first operation is specified by the second operation field.

The above and further objects and features of the invention will more fully be apparent from the following detailed description with accompanying drawings.

BRIEF DESCRIPTION OF THE DRAWINGS

FIG. 2 is a list showing values and meanings of format fields of FIG. 1;

FIG. 4 is a schematic diagram showing operation codes of a long format which can be specified by operation fields of the instruction format of FIG. 1;

FIG. 5 is a list showing addressing modes which can be specified by an operation code field of the long format of FIG. 4;

FIG. 6 is a list showing the contents of a field which specifies truth/false judging conditions of a comparison operation;

FIG. 12 is a schematic diagram showing an example of a program which is executed by the data processor according to the present invention, e.g., a source program described in the FORTRAN language for calculating the sum of products of elements belonging to arrays A and B;

FIG. 13 is a schematic diagram showing an assembler program which is obtained by translating the source program shown in FIG. 12 into an assembler language;

FIG. 14 is a schematic diagram showing an assembler program which is obtained by translating the source program shown in FIG. 12 by unrolling loops of the source program shown in FIG. 12 in such a manner that the four loops of the source program are translated into one loop;

FIG. 15 is a schematic diagram showing an example of a program which is executed by the data processor according to the present invention, e.g., a source program for examining elements of an array X and counting the number of elements whose values exceed a constant value (XLIMIT);

FIG. 16 is a schematic diagram showing an assembler program which is obtained by translating the source program shown in FIG. 15 into an assembler language;

FIG. 17 is a schematic diagram showing an example of a program which is executed by the data processor according to the present invention, e.g., a source program described in the C-language for manipulating pointer;

FIG. 18 is a schematic diagram showing an assembler program which is obtained by translating the source program shown in FIG. 17 into an assembler language;

FIG. 19 is a schematic diagram showing an example of a program which is executed by the data processor according to the present invention, e.g., a source program described in the C-language in which conditional statements (if statements) are nested;

FIG. 20 is a schematic diagram showing an assembler program which is obtained by translating the source program shown in FIG. 19 into an assembler language;

FIG. 22 is a list showing values and meanings of format fields shown FIG. 21;

FIG. 26 is a list showing values and meanings of format fields shown in FIG. 2.

DESCRIPTION OF THE PREFERRED EMBODIMENTS

In the following, a data processor according to the present invention will be described with reference to drawings showing preferred embodiments.

[First Embodiment]

(1) "Instruction Set and Register"

Figure 1:
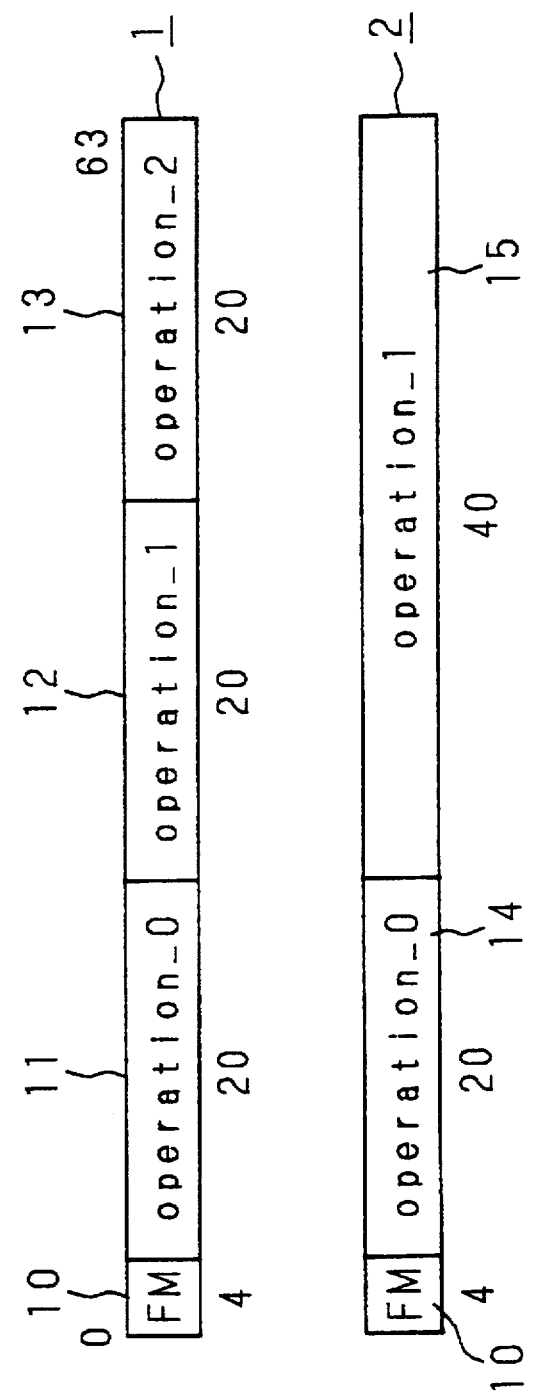
FIG. 1 is a schematic diagram showing an instruction format used in a data processor according to a first embodiment of the present invention.

FIG. 1 shows an instruction format used in a data processor according to a first embodiment of the present invention. Two types of instruction formats are prepared to be used in the data processor according to the present invention.

In FIG. 1, reference numeral 1 designates a format of a 3-operation instruction consisting of one format field (FM) 10 and three operation fields 11, 12 and 13, and reference numeral 2 designates a format of a 2-operation instruction consisting of one format field 10 and two operation fields 14 and 15. Instructions used in the data processor according to the present invention have a fixed length of eight bytes (64 bits). Both the 3-operation instruction of a format 1 and the 2-operation instruction of a format 2 shown in FIG. 1 each have a length of eight bytes in total.

In the 3-operation instruction of the format 1, the three operation fields 11, 12 and 13 each specify one operation code (operation__0, operation__1 or operation__2) of a 20-bit short format. In the 2-operation instruction of the format 2, the two operation fields 14 and 15 specify two operations in total, i.e., the operation field 14 specifies one operation code of the 20-bit short format (operation__0) while the operation field 15 specifies one operation code of a 40-bit long format (operation__1).

FIG. 2 is a list showing the contents of the format field 10, that is, detailed values and meanings of the format field 10. In the first embodiment, the format field 10 has a 4-bit configuration and it is classified into sixteen types. In the list, "2-ops." indicates the 2-operation instruction, "3-ops." indicates the 3-operation instruction, "1st" indicates that an operation designated in that column (operation__0, operation__1, or operation__2) must be executed first, "2nd" indicates that an operation designated in that column must be executed second, and "3rd" indicates that an operation designated in that column must be executed third. The symbol "---" indicates that there is no operation designated in that column.

In the format field 10, not only the 3-operation instruction of the format 1 and the 2-operation instruction of the format 2 are distinguished from each other, but also the order of the operations is specified. The specifying order of the operations as herein termed includes an order for the case in which the operations are to be executed sequentially and an order for the case in which two or three operations are to be executed in parallel.

For instance, when the value of the format field 10 is "FM=0100", the instruction is a 3-operation instruction and therefore operation__0 specified by the operation field 11 and operation__1 specified by the operation field 12 are executed in parallel first, and then operation__2 specified by the operation field 13 is executed. In this case, since operation__0 and operation__1 are executed in parallel, it is necessary that the software guarantees no conflict exists between operands of operation__0 and operation__1.

On the other hand, the hardware guarantees that operation__0 and operation__2 are executed sequentially and also that operation__1 and operation 2 are executed sequentially. Sequential execution as herein termed is an execution in which, in the same way as in the conventional data processors which execute instructions one by one sequentially, a result of an operation by an instruction to be executed first is reflected in an instruction which will be executed next.

Figure 3:
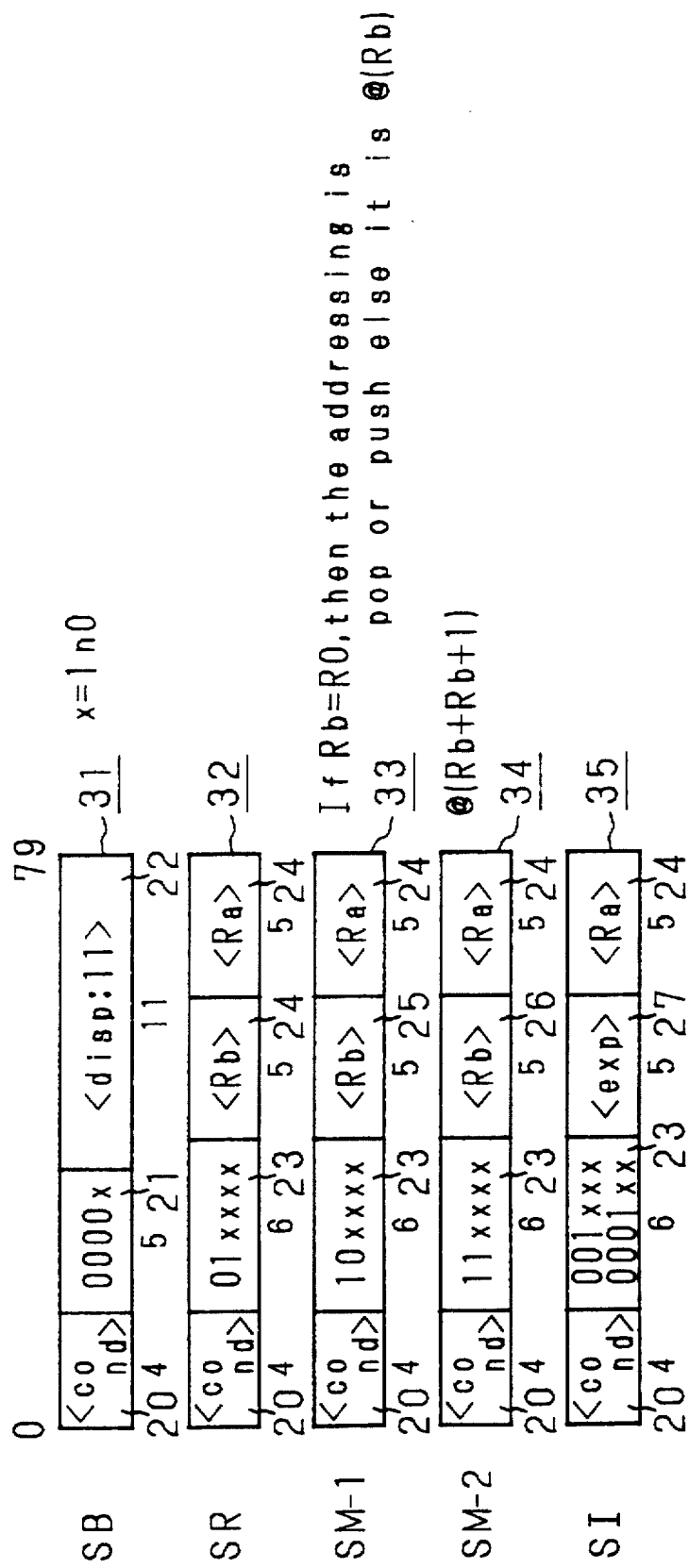
FIG. 3 is a schematic diagram showing operation codes of a short format which can be specified by operation fields of the instruction format of FIG. 1.

FIG. 3 is a schematic diagram showing details of operation codes of a short format. There are five types of the short format, i.e., an SB format 31, an SR format 32, an SM-1 format 33, an SM-2 format 34 and an SI format 35.

The five types of the short format 31, 32, 33, 34, and 35 are each formed by combining a 4-bit execution condition field (<cond>) 20, a 5-bit operation code field 21, or a 6-bit operation code field 23 each specifying the type of an operation, an 11-bit displacement field (DISP) 22 which specifies a branch width of a branch instruction, a 5-bit register field 24 which specifies an operand on a register, 5-bit indirect address fields 25 and 26 each of which specifies a register number for holding an address of an operand on a memory, and a 5-bit immediate field 27 which specifies a 5-bit immediate. Each one of the five types of the format 31, 32, 33, 34, and 35 includes the execution condition field 20 so that all operations are validated only when an execution condition specified by the execution condition field 20 is true. As herein termed, a valid operation is an operation which ensures that a result of the operation is reflected in a register, a memory, or a flag.

Operations which can be specified by the short type SB format 31 are branches and subroutine branches within a range which can be expressed by 11 bits of branch width specified by the DISP field 22. In the first embodiment, since the instructions each have a length of eight bytes, the lower three bits of an instruction address are always "0". In this case therefore, it is possible to specify a branch width up to fourteen (=3+11) bits, that is, 16bytes.

Operations which can be specified by the short type SR format 32 are sixteen types of register-register operations, including arithmetic operations such as addition and subtraction, logical operations, shift operations, bit manipulations, and so on.

Operations which can be specified by the short type SM-1 format 33 are sixteen types of loading or storing. An address of a memory operand is stored in a register which has a register number of <Rb> indicated in the indirect address field 25. When the register number of <Rb> which is indicated in the indirect address field 25 is "0", an addressing mode of an operand of the memory side becomes pop up mode from a stack at loading, and an addressing mode of an operand of the memory side becomes a push mode at storing.

Operations which can be specified by the short type SM-2 format 34 are sixteen types of loading and storing. An address of a memory operand is the sum of the contents of a register which has the register number of <Rb> indicated by the indirect address field 26 and the contents of a register which has a register number which is larger than the register number <Rb> by a value "1".

Operations which can be specified by the short type SI format 35 are twelve types of operations, including various operations such as an arithmetic operation between a 5-bit immediate of the immediate field 27 and a register, logical operations, bit manipulations, loading of an immediate, a null operation, and so on.

FIG. 4 is a schematic diagram showing details of operation codes of a long format. There are eight types of long format, i.e., an LB format 71, an LM-1 format 72, an LM-2 format 73, an LI-R format 74, an LR-R format 75, an LR-C format 76, an LI-C format 77, and an MIISC format 78 for executing various operations such as loading, storing, register-register operations, comparison, and jumps. Each one of the formats 71 to 78 includes the execution condition field 20 so that all operations are validated only when an execution condition specified by the execution condition field 20 is true in the same way as in operations specified by the short formats 31 to 35 mentioned above.

The long LB format 71 is a format for calculating a branch and a subroutine branch.

Figure 5:
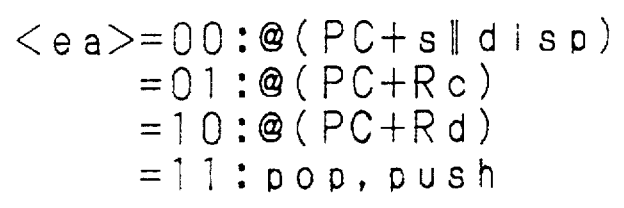

The long LM-1 format 72 is a format for a load operation and a store operation. In the long LM-1 format 72, an address of a memory operand is given by a value which is obtained by adding a signed binary value expressed by 18-bits and indicated by a field 38 to the contents of a register indicated by the field 35. The long LM-2 format 73 is also a format for a load operation and a store operation. In the long LM-2 format 73, an address of a memory operand is defined in accordance with an addressing mode indicated by a 2-bit field 41. FIG. 5 is a list showing types of the addressing mode specified by the field 41.

In FIG. 5, a value obtained by adding up a displacement and a sign-extended value becomes the address when a value of the field 41 is "<ea>=00", a value obtained by adding up a PC value and a value of a register Rc becomes the address when a value of the field 41 is "<ea>=01" and a value obtained by adding up a PC value and a value of a register Rd becomes the address when a value of the field 41 is "<ea>=10". When a value of the field 41 is "<ea>=11", the mode becomes a pop mode or a push mode.

The LI-R format 74 and the LR-R format 75 of the long type are formats for register-register 3-operand operations such as an arithmetic operation, a logical operation, shift operation, etc., of three operands, or for operations between one immediate which is expressed in sixteen bits and two register operands.

The long LR-C format 76 is a format for a comparison operation. The LR-C format 76 specifies a comparison operation between a register operand indicated by a field 48 and a register operand indicated by a field 55.

The long LI-C format 77 is also a format for a comparison operation. The LI-C format 77 specifies a comparison operation between a register operand indicated by a field 48 and an immediate operand indicated by a field 62. A field 57 is a field which specifies a true/false judging condition for a comparison operation, and details of the field 57 are shown in the list in FIG. 6. A comparison is executed on two operands under a condition which is indicated by the field 57, and true/false is judged. A field 58 specifies the flag number of a flag in which the result of the true/false judgment is to be reflected. There are eight flags. A flag which has the number specified by the field 58 changes to "11" or "10". A field 59 is a field which is used for accumulation of results of true/false judgment on a plurality of comparison operations. The field 59 consists of four bits and specifies the number of a flag from which a logical product is yielded with a result of judgment on a condition which is specified by the field 58, and the field 59 also specifies invert/non-invert of a true/false value of the flag. Bits 1 to 3 specify the number of a flag from which a logical product is to be yielded. A bit 0 specifies whether to use the flag after inverting the true/false value of an inputted flag value or to use the flag without inverting the true/false value of the inputted flag value.

The long type MISC format 78 is a format used for operations which process a number of operands such as bit and string manipulations, or for privileged operations such as a null operation and control register manipulations.

The data processor according to the present invention allows specification of at most one jump operation per one instruction so that decoding of the instruction is simple. While a jump operation may be included in each one of two operation fields within a 2-operation instruction, a jump operation can be included only in the field 11 in case of a 3-operation instruction.

Figure 7:
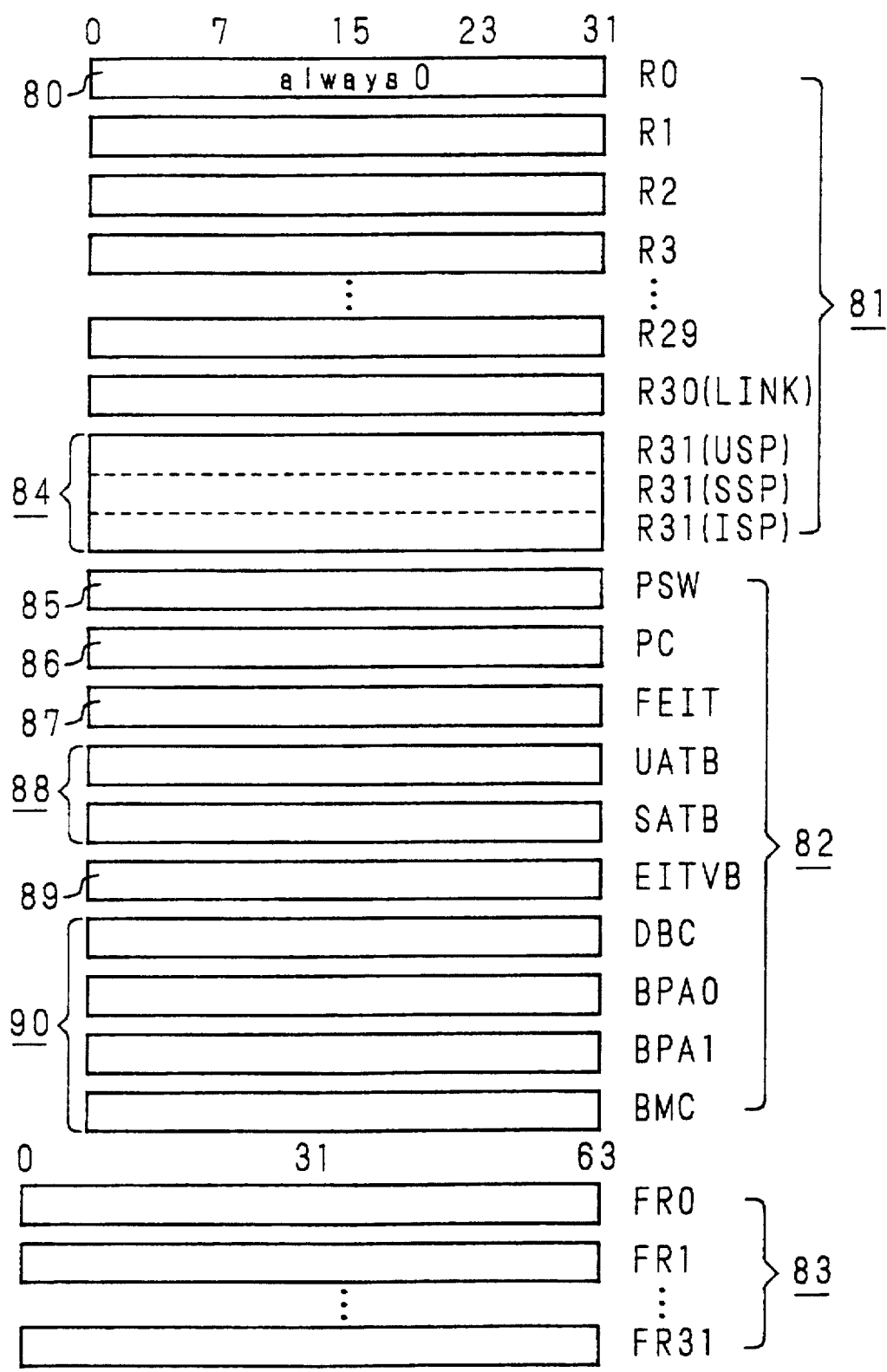
FIG. 7 is a schematic diagram showing a register configuration used in the data processor of the present invention.

FIG. 7 is a schematic diagram showing a register configuration used in the data processor of the present invention. The first embodiment uses thirty-two general purpose registers (R0 to R31) 81 each having a bit length of 32 bits, thirty-two floating-point registers (FR0 to FR31) 83 each having a bit length of 64 bits, and ten control registers 82 each having a bit length of 32 bits.

The zero-th general purpose register (R0) 80 ignores a value which is written therein and always outputs "0" when read. The thirty-first general purpose register (R31) 84 includes a user stack pointer (USP), a system stack pointer (SSP), and an interruption stack pointer (ISP), one of which becomes valid by switching a stack pointer mode.

The control registers 82 includes a processor status word (PSW) 85, a program counter (PC) 86, a floating point operation exception control register (FEIT) 87, an address translation base register (UATB) 88, an exceptional processing table base register (EITVB) 89, debug support registers (DBC, BPA0, BPA1, BMC) 90.

The floating-point registers 83 stores a short floating-point number (32-bit length) or a double-precision floating-point number (64-bit length) which is an operand for a floating-point operation.

Figure 8:
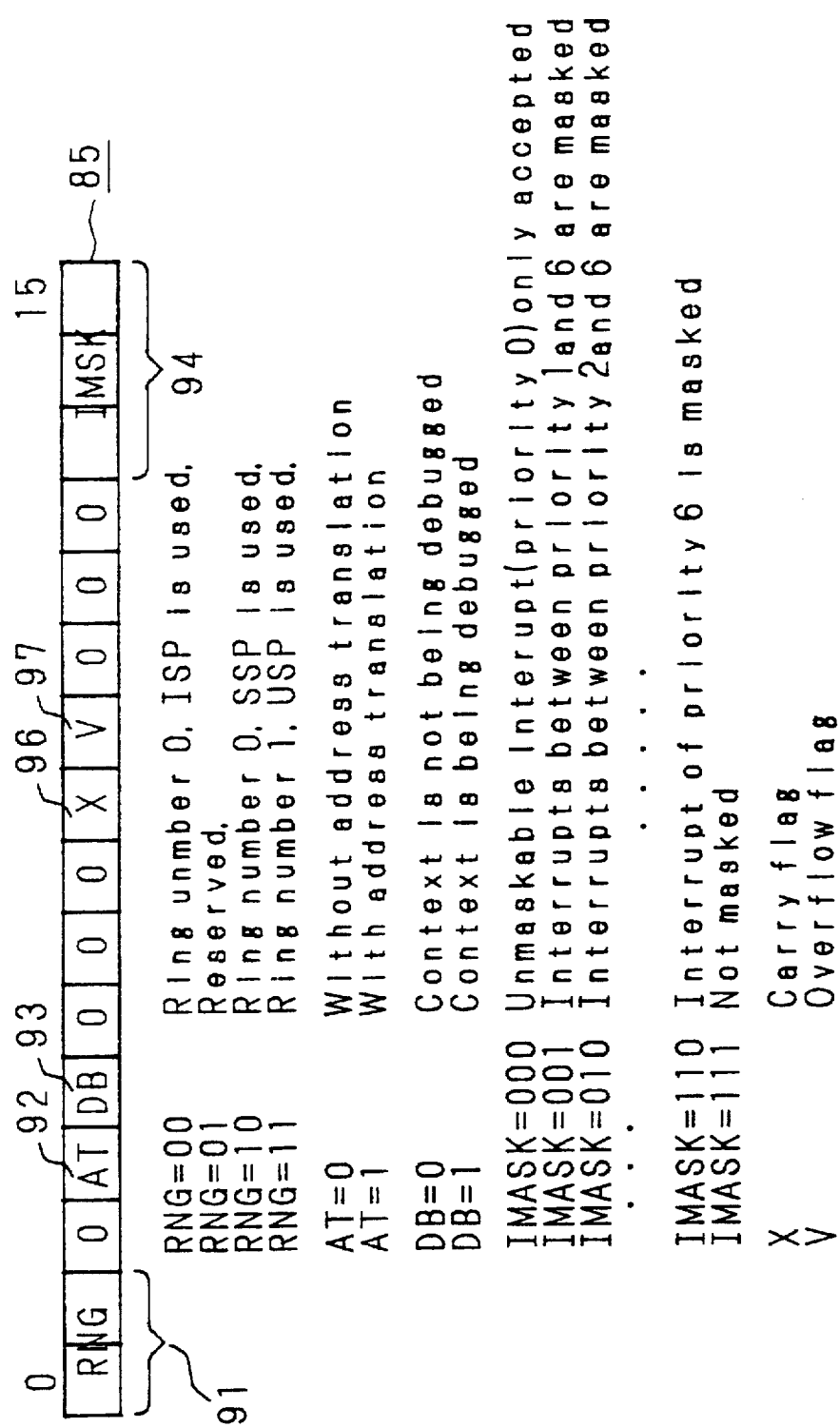
FIG. 8 is a schematic diagram showing a configuration of a first half portion of a processor status word used in the data processor of the present invention.
Figure 9:
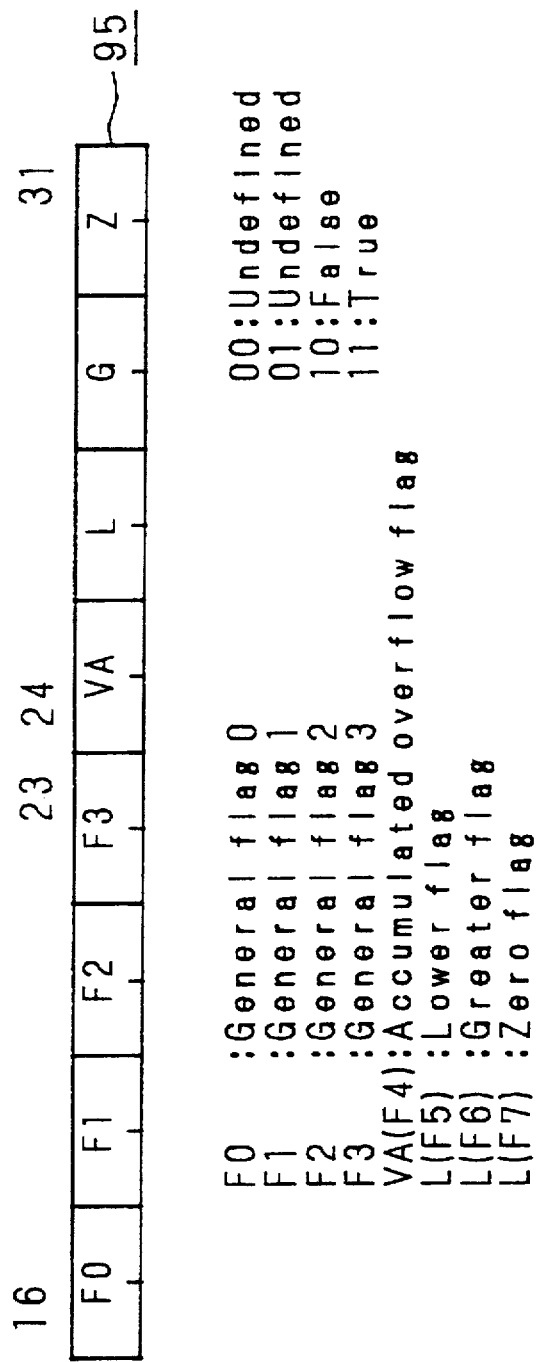
FIG. 9 is a schematic diagram showing a configuration of a last half portion of a processor status word used in the data processor of the present invention.

FIG. 8 and FIG. 9 are schematic diagrams showing detailed contents of the processor status word (PSW) 85. FIG. 8 shows detailed contents of a first half of the processor status word (PSW) 85, while FIG. 9 shows detailed contents of a second half of the processor status word (PSW) 85.

In FIG. 8, a 2-bit RNG field 91 is a field for determining a mode of a processor. In the first embodiment, the processor enters the interrupt mode when "RNG=00", the system mode when "RNG=10", and the user mode when "RNG=11". An AT field 92 is a field for switching an address translation on and off. A 1-bit DB field 93 is a field for switching ON/OFF of a debug, mechanism. A 1-bit X field 96 is a carry flag, and is used for arithmetic operation of extending significant digit number of an integer. A 1-bit V field 97 is an overflow flag, and is set when an overflow occurs by an integer arithmetic operation but is reset when there is no overflow. A 3-bit IMASK field 94 is a field for controlling a mash condition of an external interruption. Eight condition flags 95 are each formed of two bits. Each condition flag 95 is read or a value is written into the flag 95 by explicitly specifying the flag number by a comparison instruction. Further, each condition flag 95 is referred or updated when the content of the processor status word 85 is read or rewritten into response to a control register access instruction.

The condition flags 95 shown in FIG. 9 play an important role to determine whether operations included in the instruction of the data processor of the present invention are valid or invalid. In the first embodiment, bit 1 to bit 3 of the 4-bit execution condition field 20 included in each format of an instruction specify the flag number of one of the eight condition flags 95, and bit 0 of the 4-bit execution condition field 20 indicates whether to validate an operation when the flag which is specified by bit 1 to bit 3 is "false=10" or to validate the operation when flag which is specified by the bit 1 to bit 3 is "true=11". When the flag specified by bit 0 to bit 3 is "undefined–00 or 01" or when the specified content is different from the flag value, the operation is invalidated. An initial value of a flag F0 of the condition flags 90 is "false=10" but other flags have an initial value of "undefined=00". The initial value of the flag F0 is "10" in order to unconditionally validate each operation, determining that the condition field 20 of each instruction format indicates that "an operation is valid when 1000=F0 is false" in an initial condition. Each flag can be a target flag which reflects an operation result of the condition specified by the field 57 of the LR-C and the LI-C formats, and only specific one of the flags specified by the field 58 changes. However, three of the flags may change at the same time depending on a result of addition or an general purpose comparison operation, etc. In addition, a VA(F4) flag is also "true=11" when an overflow occurs in an integer operation after initializing at a particular time.

(2) "Hardware Configuration"

Figure 10:
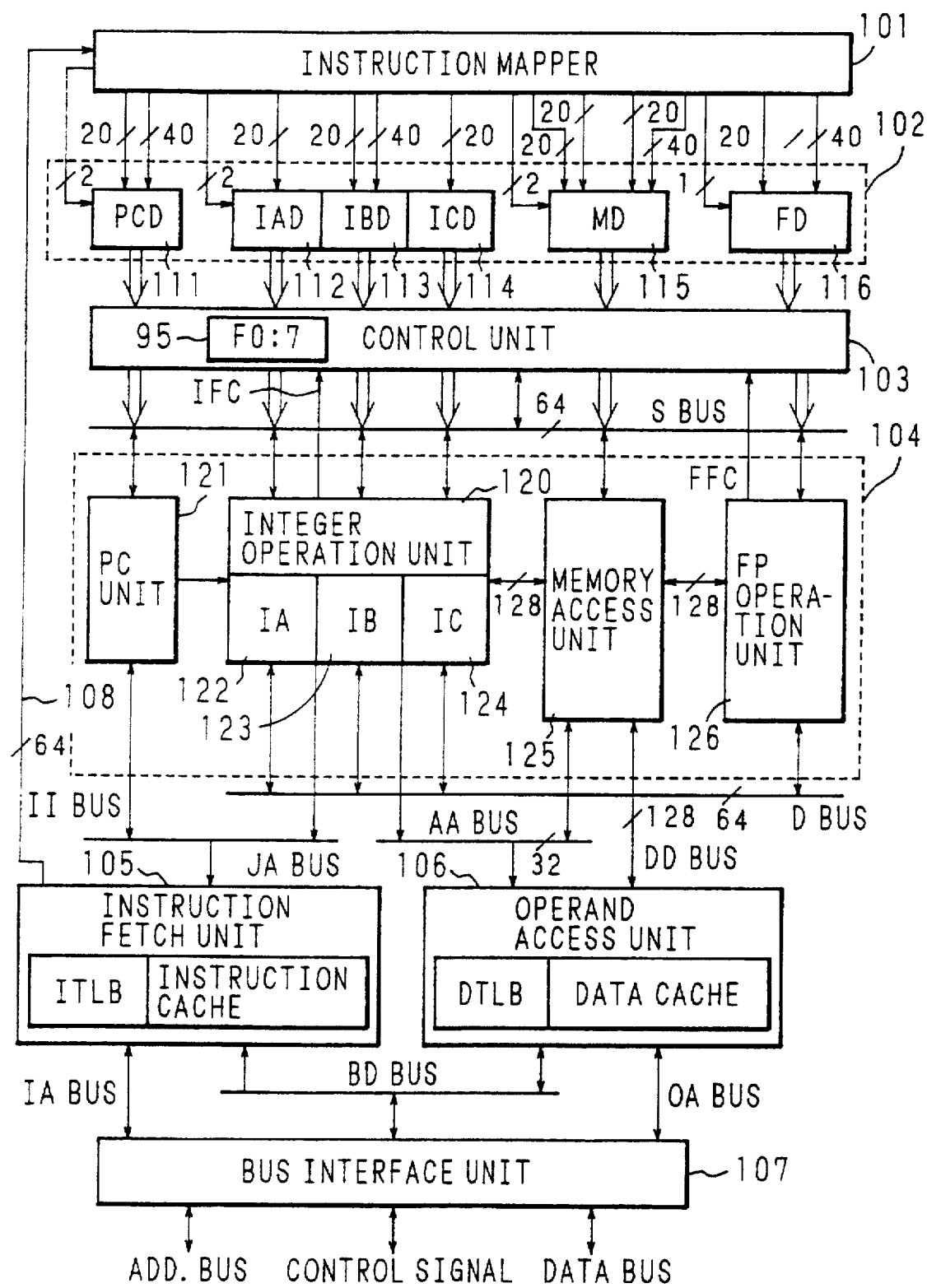
FIG. 10 is a block diagram showing an example of an overall configuration of the data processor according to the first embodiment of the present invention.

FIG. 10 is a block diagram showing an overall configuration of the data processor according to the first embodiment of the present invention.

Reference numeral 107 designates a bus interface unit which connects the data processor according to the present invention and an external memory by means of an address bus, a data bus and a control signal.

Reference numeral 105 designates an instruction fetch unit which comprises an instruction cache and an instruction address translation buffer (ITLB). The instruction fetch unit 105 fetches an instruction from the instruction cache or the external memory through a bus interface unit 107, and transfers the instruction to an instruction mapper 101 via a 64-bit II bus 68.

Reference numeral 106 designates an operand access unit which comprises a data cache and a data address translation buffer (DTLB). The operand access unit 106 fetches a data from the data cache or the external memory through the bus interface unit 107 and then transfers the data to a memory access unit 125, or writes data transferred from the memory access unit 125 into the external memory through the bus interface unit 107.

The instruction mapper 101 decomposes a 64-bit instruction which has been transferred from the instruction fetch unit 105 into operation fields in accordance with the contents of the format field 10 which is the first four bits of the 64-instruction, and transfers the operation fields in a specified order to an instruction decoder 102. During this procedure, the instruction mapper 101 rearranges and transfers the operation fields to a decoder in a corresponding one of six decoders 111 to 116 in accordance with types of the operations.

The instruction decoder 102 is configured by: a PCD 111 which decodes a field of jump operation of a short format 31 or a long format 71; an IAD 112, an IBD 113, and an ICD 114 which decode a field for operations regarding an operand held in the general purpose registers such as an integer arithmetic operation of short formats 32 and 34, or long formats 74 to 78; an MD 115 which decodes a field of load/store operation of a short format 33 or long formats 72 and 73; and an ED 116 which decodes a field of a floating point operation of long formats 72 to 77.

A control circuit 103 includes the flags 95 of the processor status word 85, and controls the operation unit 104 in accordance with a decoded result by the instruction decoder 102 and the contents of the flags 95.

The operation unit 104 is configured by six portions, i.e., a PC unit 121, an integer operation unit 120 which consists of three portions, a memory access unit 125, and a floating-point operation unit 126, corresponding to the six decoders 111 to 116 of the instruction decoder 102.

The PC unit 121 includes a program counter and an adder. For an instruction except for a jump instruction, the PC unit 121 adds "8" to a PC value of an executed instruction to calculate a PC value of an instruction to be executed next. For a jump instruction, the PC unit 121 adds a branch displacement to a PC value of the executed jump instruction or calculates in accordance with an addressing mode specified by the instruction, thereby getting a PC value of an instruction at a jump destination.

The integer operation unit 120 includes the multiple-port general purpose registers 81 and the control registers 82 shown in FIG. 7, three shifters and three ALUs. The integer operation unit 120 is configured by three integer operation mechanisms (IA, IB, IC) 122, 123, and 124 for executing three integer operations in parallel.

The floating-point operation unit 126, including the floating-point registers 83 shown in FIG. 7 and operation mechanisms such as a floating-point adder and a floating-point multiplier, executes a floating-point operation. The PC unit 121, the integer operation mechanisms 122, 123, and 124, and the floating-point operation unit 126 operate independently of each other. At need, data can be transferred between these units through buses.

The memory access unit 125 cooperatively operates with the other portions 121, 120, and 126 of the operation unit 104. Data are transferred between the memory access unit 125 and the operand access unit 106.

The operation unit 104 is connected with the instruction fetch unit 105 and the operand access unit 106 by a JA bus, an AA bus and a DD bus. The instruction fetch unit 105 and the operand access unit 106 transfer an instruction address, a data address, and data to and from the operation unit 104.

(3) "Instruction Mapper and Instruction Decoder"

Figure 11:
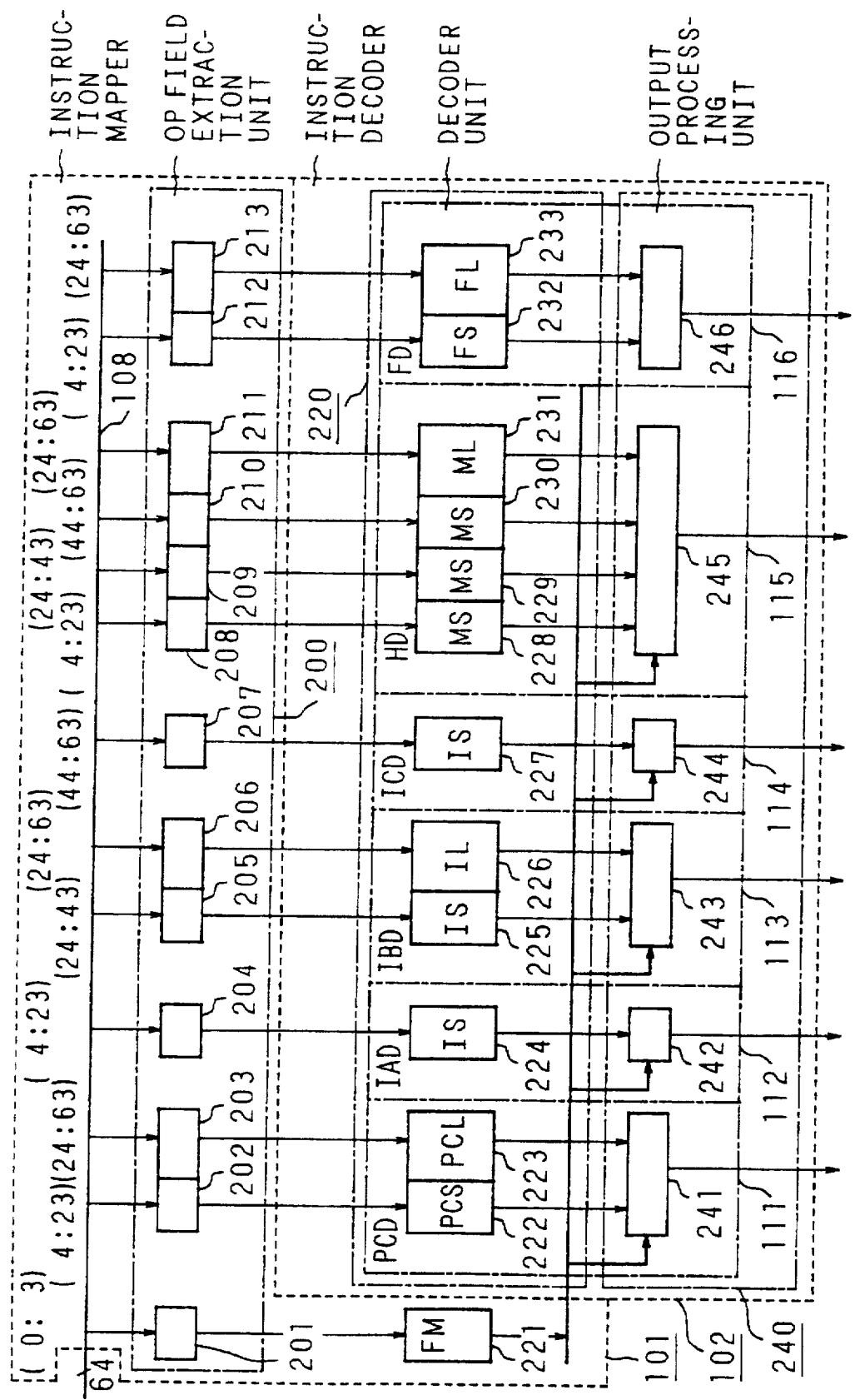
FIG. 11 is a block diagram showing an example of a configuration of an instruction mapper and an instruction decoder of the data processor according to the first embodiment of the present invention.

FIG. 11 is a block diagram showing an example of specific configuration of the instruction mapper 101 and the instruction decoder 102. The instruction mapper 101 is configured by: an operation field extraction unit 200 for extracting the format field 10 and the operation fields 11 to 15 from a 64-bit instruction code which is outputted to the II bus 108; and an FM decoder 221 for decoding the format field 10.

Each one of extraction units 201 to 213 of the operation field extraction unit 200 extracts some of bit fields of the an instruction code on the II bus 108, and outputs a bit string of each operation field corresponding to each one of the decoders 111 to 116 which form the instruction decoder 102. Of the 64 bits on the II bus 108, the extraction unit 201 extracts bit 0 to bit 3, the extraction unit 202 extracts bit 4 to bit 23, the extraction unit 203 extracts bit 24 to bit 63, the extraction unit 204 extracts bit 4 to bit 23, the extraction unit 205 extracts bit 24 to bit 43, the extraction unit 206 extracts bit 24 to bit 63, the extraction unit 207 extracts bit 44 to bit 63, the extraction unit 208 extracts bit 4 to bit 23, the extraction unit 209 extracts bit 24 to bit 43, the extraction unit 210 extracts bit 44 to bit 63, the extraction unit 211 extracts bit 24 to bit 63, the extraction unit 212 extracts bit 4 to bit 23, and the extraction unit 213 extracts bit 24 to bit 63. Extracted bits are outputted to the instruction decoder 102.

The instruction decoder 102 (PCD 111, IAD 112, IBD 113, ICD 114, MD 115, FD 116) is configured by a decoder unit 220 and an output processing unit 240. More specifically, the PCD 111 is configured by a PCS decoder 222 for decoding a jump operation code of the short format extracted by the extraction unit 202, a PCL decoder 223 for decoding a jump operation code of the long format extracted by the extraction unit 203, and an output processing unit 241. To the control circuit 103, the output processing unit 241 outputs a control signal which instructs for executing a jump operation according to an output from the PCS decoder 222 or the PCL decoder 223, a non- jump operation for adding "8" to a current PC value, or a null operation, in accordance with a decoded result performed by the three decoders, i.e., the PCS decoder 222, the PCL decoder 223, and the FM decoder 221.

The IAD 112 is configured by an IS decoder 224 for decoding an integer operation code of the short format extracted by the extraction unit 204 and an output processing unit 242. To the control circuit 103, the output processing unit 242 outputs a control signal which instructs for executing an integer operation according to an output from the IS decoder 224 or a null operation, in accordance with decoded results performed by the IS decoder 224 and the FM decoder 221.

The IBD 113 is configured by an IS decoder 225 for decoding an integer operation code of the short format extracted by the extraction unit 205, an IL decoder 226 for decoding an integer operation code of the long format extracted by the extraction unit 206, and an output processing unit 243. To the control circuit 103, the output processing unit 243 outputs a control signal which instructs for executing an integer operation according to an output from the IS decoder 225, the IL decoder 226, or a null operation, in accordance with a decoded result performed by the IS decoder 225, the IL decoder 226 and the FM decoder 221.

The ICD 114 is configured by an IS decoder 227 for decoding an integer operation code of the short format extracted by the extraction unit 207 and an output processing unit 244. To the control circuit 103, the output processing unit 244 outputs a control signal which instructs for executing an integer operation according to an output from the IS decoder 227 or a null operation, in accordance with a decoded result performed by the IS decoder 227 and the FM decoder 221.

The MD 115 is configured by MS decoders 228, 229, and 230 for decoding memory access operation codes of the short format extracted by the extraction units 208, 209, and 210 respectively, an ML decoder 231 for decoding memory access operation codes of the long format extracted by the extraction unit 211, and an output processing unit 245. To the control circuit 103, the output processing unit 245 outputs a control signal which instructs for executing a memory access operation according to an output from one of the MS decoders 228, 229, and 230 and the ML decoder 231 or a null operation, in accordance with results of decoding performed by the five decoders, i.e., the MS decoders 228, 229, and 230, the ML decoder 231, and the FM decoder 221.

The FD 116 is configured by an FS decoder 232 for decoding a floating-point operation code of the short format extracted by the extraction unit 212, an FL decoder 233 for decoding a floating-point operation code of the long format extracted by the extraction unit 213, and an output processing unit 246. To the control circuit 103, the output processing unit 246 outputs a control signal which instructs for executing a floating-point operation according to an output from one of the FS decoder 232 and the FL decoder 233 or a null operation, in accordance with decoded results performed by the FS decoder 232, the FL decoder 233, and the FM decoder 221.

Outputs from the output processing unit 240 (241 to 246) are inputted to the control circuit 103 and used to control an operation performed by the operation unit 104. More particularly, an output from the output processing unit 241 is used to control a PC calculation by the PC unit 121. Outputs from the output processing units 242, 243, and 244 are used to control integer operations performed by the integer operation mechanisms (IA, IB, IC) 122, 123, and 124 of the integer operation unit 120, respectively. An output from the output processing unit 245 is used to control a memory access operation performed by the memory access unit 125. An output from the output processing unit 246 is used to control a floating-point operation performed by the floating-point operation unit 126.

A decoded result performed by the FM decoder 221 is outputted partly to the instruction fetch unit 105 to control the output timing of the next instruction code to the II bus 108. When an instruct ion requires sequential execution of two or three operations, a value of the II bus 108 is held for two or three clock cycles, whereby output from each output processing unit 241 to 246 is controlled in accordance with an operation order specified by the format field 10. As a result, to the operation unit corresponding to an operation field which is valid at the timing of a clock, a control signal corresponding to a decoded result of that operation field is outputted from the output processing units 241 to 246, while to the operation unit according to an operation field which is invalid at the timing of a clock, a control signal which instructs a null operation is outputted from the output processing units 241 to 246.

The tables below list operations which can be specified only by the short format, operations which can be specified both by the short format and the long format, operations which can be specified only in the long format, and information regarding the decoders which execute the respective operations.

Table 1 is a list of operations which can be specified by operation codes of only the short format. There are twenty-four types of such operations. Table 2 is a list of operations which can be specified both in the short format and the long format. There are nineteen types of such operations. Table 3 is lists of operations which can be specified by operation codes of only the long format. There are seventy-four types of such operations.

In Table 1 to Table 3, the column "mnemonic" shows abbreviations and operands of operations and the column "function" shows the meanings of the operations. The column "type" shows types of decoders to which the instruction mapper 101 distributes the operations. That is, the instruction mapper 101 distributes operation codes of the type "PC" to the PCS decoder 222 or the PCL decoder 223, codes of the type "Integer" to the IS decoder 224, the IS decoder 225, the IL decoder 226, or the IS decoder 227, codes of the type "Memory" to the MS decoder 228, the MS decoder 229, the MS decoder 230, or the ML decoder 231, codes of the type "Floating point (FP)" to the FS decoder 232 or the FL decoder 233, depending on whether the format is the short format or the long format and a field position on an instruction.

In the column "format", the symbol SR denotes "Short Register", the symbol SI denotes "Short Immediate", the symbol SM denotes "Short Memory", the symbol SB denotes "Short Branch", the symbol LR denotes "Long Register", the symbol LI denotes "Long Immediate", the symbol LM denotes "Long Memory" and the symbol LB denotes "Long Branch".

(4) "Example of instruction Execution"

FIG. 12 to FIG. 20 are views showing examples of a program used in the data processor according to the present invention. These examples show source programs described in the FORTRAN and the C-language and assembler programs which are obtained by describing the source programs in an assembler language of the data processor according to the present invention.

In each assembler program, two or three operations are grouped. Two or three operations of each group are encoded into the format 1 or 2 shown in FIG. 1, and processed as one instruction in the data processor according to the present invention.

Figure 12:
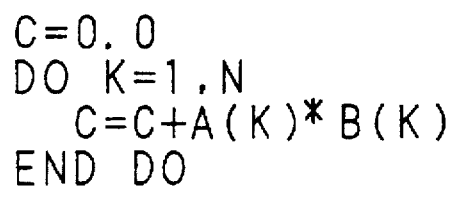

FIG. 12 shows a source program described in FORTRAN for calculating the sum of products of elements which are included in arrays A and B. FIG. 13 shows an assembler program which is obtained by translating this source program into an assembler language. The first three instructions of the assembler program are initial setting of a loop and the last three instructions form the loop. Since execution of the loop spends most of an execution time of this program, it is important to execute the last three instructions at high speed. In the data processor according to the present invention, eight operations included within a loop are encoded into three instructions and three or two operations are executed in parallel in each instruction, and loop operation is executed at high speed.

An instruction 301 is a 2-operation instruction for executing two operations in parallel, i.e., an operation (FLD) 303 for loading a floating point from a memory to a floating-point register FR1 (this operation is encoded into the long format) and an operation (LDI) 304 for loading an immediate to a general purpose register R1 (this operation is encoded into the short format). An instruction 302 is a 3-operation instruction for executing three operations in parallel, i.e., an operation (FLD) 305 for loading a floating point from a memory to a floating-point register FR2 (this operation is encoded into the short format), an operation (ADDI) 306 for adding an immediate to a general purpose register R1 (this operation is encoded into the short format) and an operation (ADDI) 307 for adding an immediate to a general purpose register R2 (this operation is encoded into the short format).

A description "1C0F" designated by numeral 313 is a field which indicates the timing and a condition of executing the operation (FLD) 303. The first number "1" indicates that this operation is issued immediately after decoding and the following "C0F" indicates that this operation is valid when the condition flag F0 is "false=10". The issuing timing "1" of the operation of the field 313 and the issuing timing "1" of an operation of a field 314 are encoded into the format field 10 of an instruction code of the format 1, with a fact that this instruction is a 2-operation instruction. Execution conditions "C0F" for the fields 313 and 314 are encoded into the respective execution condition field 20 corresponding to the operation (FLD) 303 and operation (LDI) 304.

At processing of the instruction 301, an operation code of the operation (FLD) 303 is cut out by the extraction unit 211 of the instruction mapper 101, decoded by the ML decoder 231, supplied to the control circuit 103 through the output processing unit 245, and executed by the memory access unit 125. An operation code of the operation (LDI) 304 is cut out by the extraction unit 204 of the instruction mapper 101, decoded by the IS decoder 224, supplied to the control circuit 103 through the output processing unit 242, and executed by the IA 122. Assuming that the flag F0 is "10", both the operation (FLD) 303 and the operation (LDI) 304 are valid and both timing designations are "1". Hence, the operation (FLD) 303 and the operation (LDI) 304 are executed in parallel without any delay, and operation results are reflected in the registers FR1 and R1.

Since the instruction 301 is an instruction in which operation fields of the short format are assigned to bit 4 to bit 23 and operation fields of the long format are assigned to bit 24 to bit 63, bit strings cut out by the extraction units 205, 207, 209, and 210 which correspond to the remaining operation fields are not valid. Hence, the FM decoder 221 outputs an invalidating signal and decoded results are invalidated at the output processing unit 240. Since operation codes Cut out by the extraction units 202, 203, 206, 208, 212, and 213 and then transferred to the decoder unit 220 are not operation codes which are to be decoded by the respective decoders, the decoder unit 220 changes these operation codes into null operation codes, and outputs them.

At processing of the instruction 302, an operation code of the operation (FLD) 305 is cut out by the extraction unit 208, decoded by the MS decoder 228, supplied to the control circuit 103 through the output processing unit 245, and executed by the memory access unit 125. Operation codes of the operation (ADDI) 306 and (ADDI) 307 are cut out by the extraction units 205 and 207, decoded by the IS decoders 225 and 227, supplied to the control circuit 103 through the output processing units 243 and 244, and executed by the IB 123 and IC 124, respectively. Assuming that the flag F0 is "10", the operation (FLD) 305 and the operations (ADDI) 306 and the operation (ADDI) 307 are all valid and all the timing designation are "1". Hence, the three operations are executed in parallel without any delay, and the operation results are reflected in the registers FR2, R1, and R2.

Since the instruction 302 is an instruction in which operation fields of the short format are assigned to bit 4 to bit 23, bit 24 to bit 43, and bit 44 to bit 63, bit strings cut out by the extraction units 203, 206, 211, and 213 corresponding to the remaining operation fields are not valid. Hence, the FM decoder 221 outputs an invalidating signal and decoded results are invalidated by the output processing unit 240. Operation codes cut out by the extraction units 202, 204, 209, 210, and 212 and then supplied to the decoder unit 220 are not operation codes which are to be decoded by the respective decoders, the decoder unit 220 changes these operation codes into null operations and outputs them.

FIG. 14 shows an assembler program which is obtained by unrolling loops of the source program shown in FIG. 12 in such a manner that the four iterations of the source program are translated into one iteration. The purpose of unrolling the loops is to reduce the execution time of the program. While three instructions correspond to an operation of one iteration of the source program in the assembler program shown in FIG. 13, six instructions realize four iterations of the source program in the assembler program shown in FIG. 14.

The reduction in the number of instructions is attributed to a reduction in branch operations BRA and to a use of an operation (FLD4) 309 for loading four data values into four registers from a continuous area of the memory. In the data processor according to the present invention, since an execution time of the operation (FLD4) 309 for loading four data values from the memory takes two clock cycles, the effect of reducing the number of operation does not always contribute directly a reduction in the execution time. However, since the assembler program shown in FIG. 14 requires that an operation of four iterations of the source program is executed in nine clock cycles (the branch operation BRA and the operation FLD4 are executed in two clock cycles each, and the remaining operations are executed in one clock cycle each), the assembler program shown in FIG. 14 is at least twice faster than the assembler program shown in FIG. 13 in which an operation of one iteration of the source program is executed in five clock cycles (the branch operation BRA is executed in two clock cycles 10 and the remaining operations are executed in one clock cycle each).

Figure 15:
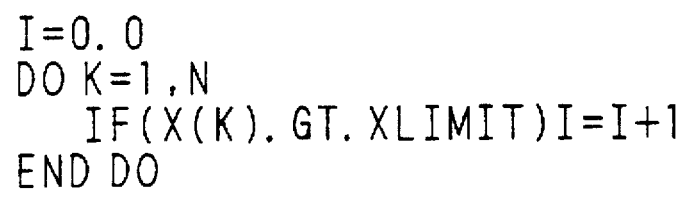

FIG. 15 and FIG. 16 are schematic diagrams showing programs for examining elements of an array X and counting the number of elements whose values exceed a constant value (XLIMIT). FIG. 15 shows such a source program and FIG. 16 shows an assembler program which is obtained by translating the source program.

The last three instructions of the assembler program of FIG. 16 form a loop. An instruction 320 in the loop is consists of an operation (ADDI) 321 for adding an immediate to the register R1, a branch operation (BRA) 323, and a null operation (NOP) 325. The operation (ADDI) 321 is valid when a flag F4 is "true=11" in accordance with a value "C4T" of an execution condition field 322, and a new value is written into a register R3. Since the flag F4 becomes "11" when the value of the element of the array X is larger than XLIMIT or "10" when the value of the element of the array X is equal to or smaller than XLIMIT by a result of an operation (FCGT) 326, the operation (ADDI) 321 consequently counts the number of elements of the array X whose values exceed XLIMIT. The branch operation (BRA) 323 branches to a label L1 when a flag F3 is "false=10" in accordance with a value "C3F" of an execution condition 324. The flag F3 becomes "11" when the operation (CMP) 327 is done for the last element of the array X and becomes "10" in other cases. That is, the branch operation (BRA) 323 is used to control the D0 loop of FIG. 15.

FIG. 17 is a schematic diagram showing a source program described in the C-language for executing a pointer manipulation, and FIG. 18 is a schematic diagram showing an assembler program which is obtained by translating the source program of FIG. 17.

An instruction 330 executes three store operations (STW) 331, 333, and 335. Values "1", "2", and "3" at the beginning of fields 332, 334, and 336 specify the timing of issuing the three store operations (STW) 331, 333 and 335 in this instruction, respectively. These three store operations are executed sequentially. The operations 331, 333, and 335 are cut out by the extraction units 208, 209, and 210 of the instruction mapper 101, respectively, decoded by the MS decoders 228, 229, and 230, respectively, and outputted to the output processing unit 245, respectively. The output processing unit 245 delays decoded results of the MS decoder 229 and 230 by one and two clock cycles, and supplies the delayed decoded results to the control circuit 103, respectively, in accordance with a decoded result of the format field 10 which specifies the timing of issuing the respective operations. Hence, the three store operations (STW) 331, 333, and 335 are sequentially executed by the memory access unit 125.

An instruction 340 executes a load operation (LDW) 341, a comparison operation (CMP) 343, and a branch operation (BRA) 345. Values "1", "2", and "3" at the beginning of fields 342, 344, and 346 specify the timing of issuing the three operations in this instruction, respectively. These three operations are executed sequentially. The operations 341, 343, and 345 are encoded into three operation fields 12, 13, and 14 of the format 1, respectively, cut out by the extraction units 209, 207, and 202 of the instruction mapper 101, respectively, decoded by the MS decoder 229, the IS decoder 227, and the PCS decoder 222, respectively, and outputted to the output processing units 245, 244, and 241, respectively. In accordance with a decoded result of the format field 10 which specifies the timing of issuing the respective operations, the output processing units 244 and 241 delay the decoded results one and two clock cycles, respectively, and output the delayed results to the control circuit 103 in a specified order. Hence, the operation (LDW) 341 is executed first, the operation (CMP) 343 is executed next, and the operation (BRA) 345 is executed last. The operation (CMP) 343 uses the value which is loaded into the register R1 as a result of the operation (LDW) 341. The operation (BRA) 345 performs processing depending on the value of the flag F1 which changes with a result of the operation (CMP) 343. Therefore, the result of parallel execution of these three operations is different from the result of sequential execution of these three operations.

FIG. 19 is a schematic diagram showing a source program described in the C-language in which conditional statements (if statements) are nested, and FIG. 20 is a schematic diagram showing an assembler program which is obtained by translating the source program of FIG. 19 into an assembler language.

This program requires to perform special processing when a value of an element of an array is "2", but otherwise it requires that elements of two arrays are scanned sequentially and either "1" or "−1" is returned depend on which array has a larger element value.

An operation (IFG) 350 is an instruction for initializing a flag. When this operation is executed, only the flag F0 becomes "false=10" and the other flags F1 to F7 become "undefined=00". Since each operation has an execution condition in the data processor according to the present invention, a valid operation cannot be executed under a condition that all flags have the value "00". Hence, only the flag F0 is set to become "10" in an initial state so that an operation is executed on a premise that the flag F0 has the value "10" for most of the program.

An operation (CNE) 351 examines whether a value of the register R3 and a value of the register R4 are not equal to each other ("riot equal"), and reflects the result in the flag F6.

An operation (CLT) 352 examines whether a value of the register R3 is smaller than a value of the register R4 ("less than"), and reflects the result in the flag F7. Since an execution condition of this instruction is specified as "C6T", the flag F7 is changed to "11" or "10" only when the flag F6 is "true=11". That is, when the flag F6 is "false=10", the flag F7 is kept "undefined=00".

An operation (LDI) 353 is an operation whose result is validated when the flag F7 is "11" so that a value "−1" is written into the register R15.

An operation (LDI) 354 is an operation whose result is validated when the flag F7 is "10" so that a value "1" is written into the register R15.

An operation (JMP) 355 is an instruction which returns control to the caller routine when the flag F6 is "11". When "aa≠bb", a value "1" or "−1" is returned to the caller routine as a result of these three operations. When "aa=bb", no value is written into the register R15 and control is riot returned to the caller routine.

[Other Embodiments]

The first embodiment described above is related to a data processor in which the format field 10 of an instruction consists of four bits and an instruction which specifies two or three operations despite being one instruction is executed. However, it is possible to realize a data processor for executing an instruction which includes a format field specifying the format of the instruction and the sequence of operations even when the bit number of the format field or the number of operations which can be specified with one instruction is different from that of the first embodiment.

Figure 21:
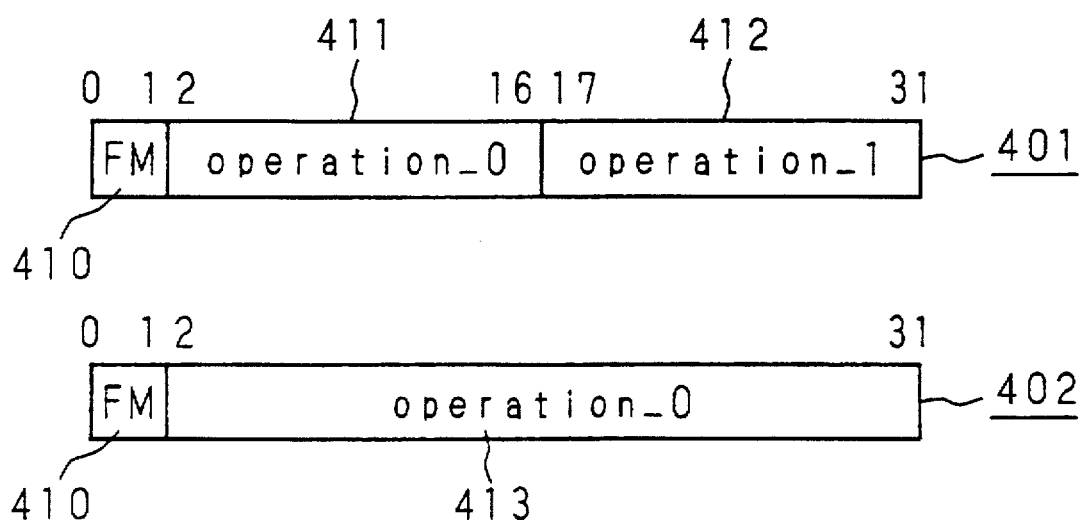
FIG. 21 is a schematic diagram showing an instruction format used in a data processor according to a second embodiment of the present invention.

FIG. 21 is a schematic diagram showing an instruction format used in a data processor according to a second embodiment of the present invention, in which the format field consists of two bits and one instruction includes one or two operation fields.

The second embodiment uses two types of instruction formats. Reference numeral 401 is a format of a 2-operation instruction which is formed of one format field (FM) 410 and two operation fields 411 and 412. Numeral 402 specifies a format of a 1-operation instruction which is formed of one format field (FM) 410 and one operation field 413. In the second embodiment, an instruction has a fixed length of four bytes (thirty-two bits). Both the 2-operation instruction of the format 401 and the 1-operation instruction of the format 402 shown in FIG. 21 each have a length of four bytes in total.

In the 2-operation instruction of the format 401, the two operation fields 411 and 412 each specify one operation code of a 15-bit short format. In the 1-operation instruction of the format 402, the one operation field 413 specifies one operation code of a 30-bit long format.

FIG. 22 is a list showing the contents of the format field 410, that is, detailed values and meanings of the format field 410. In the second embodiment, the format field 410 has a 2-bit configuration and there are four types of the format field 410. In the list, the symbols "1st", "2nd" and "---" express similar meanings as those used in the first embodiment shown in FIG. 2.

The format field 410 not only distinguishes 10 the 2-operation instruction of the format 401 from the 1-operation instruction of the format 402 but also specifies the order of two operations. The order of the operations as herein termed includes an order for a case in which two operations are to be executed sequentially and an order for a case in which two operations are to be executed in parallel as shown in FIG. 22.

Figure 23:
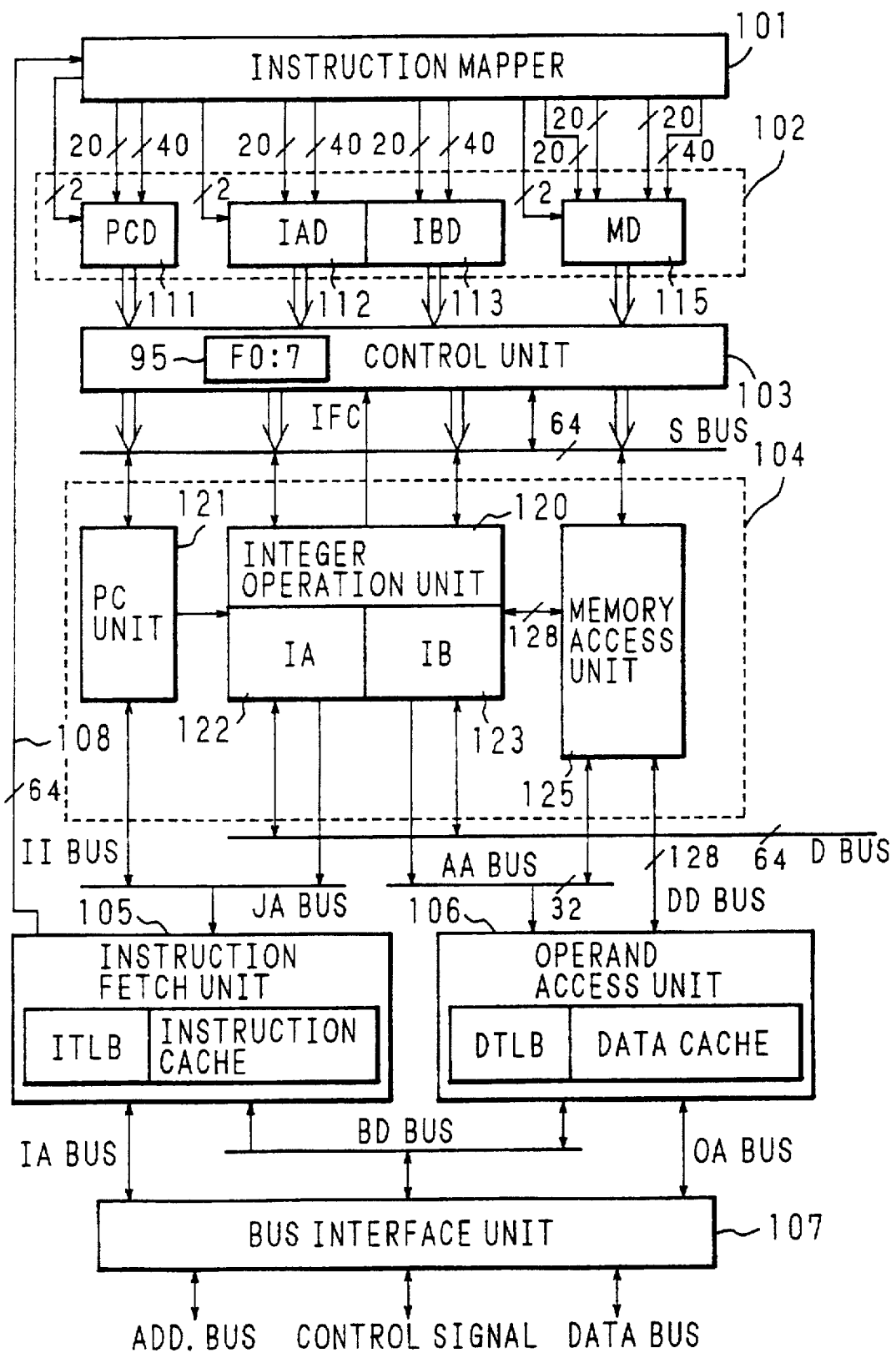
FIG. 23 is a block diagram showing an example of an overall configuration of the data processor according to the second embodiment of the present invention.

A hardware configuration of the second embodiment is shown in FIG. 23. The hardware configuration is similar to the hardware configuration of the first embodiment shown in FIG. 10. A principal difference is that the instruction decoder and the integer operation unit for an integer operation are formed of two sub-blocks rather than of three sub-blocks. To be more specific, of the three sets designated by 112, 113, 114 and 122, 123, 124 in FIG. 10, the two sets designated by 112, 113 and 122, 123 form the instruction decoder and the integer operation unit for an integer operation. Another principal difference is that the instruction decoder 116 and the operation unit 126 for a floating-point operation are omitted.

Figure 24:
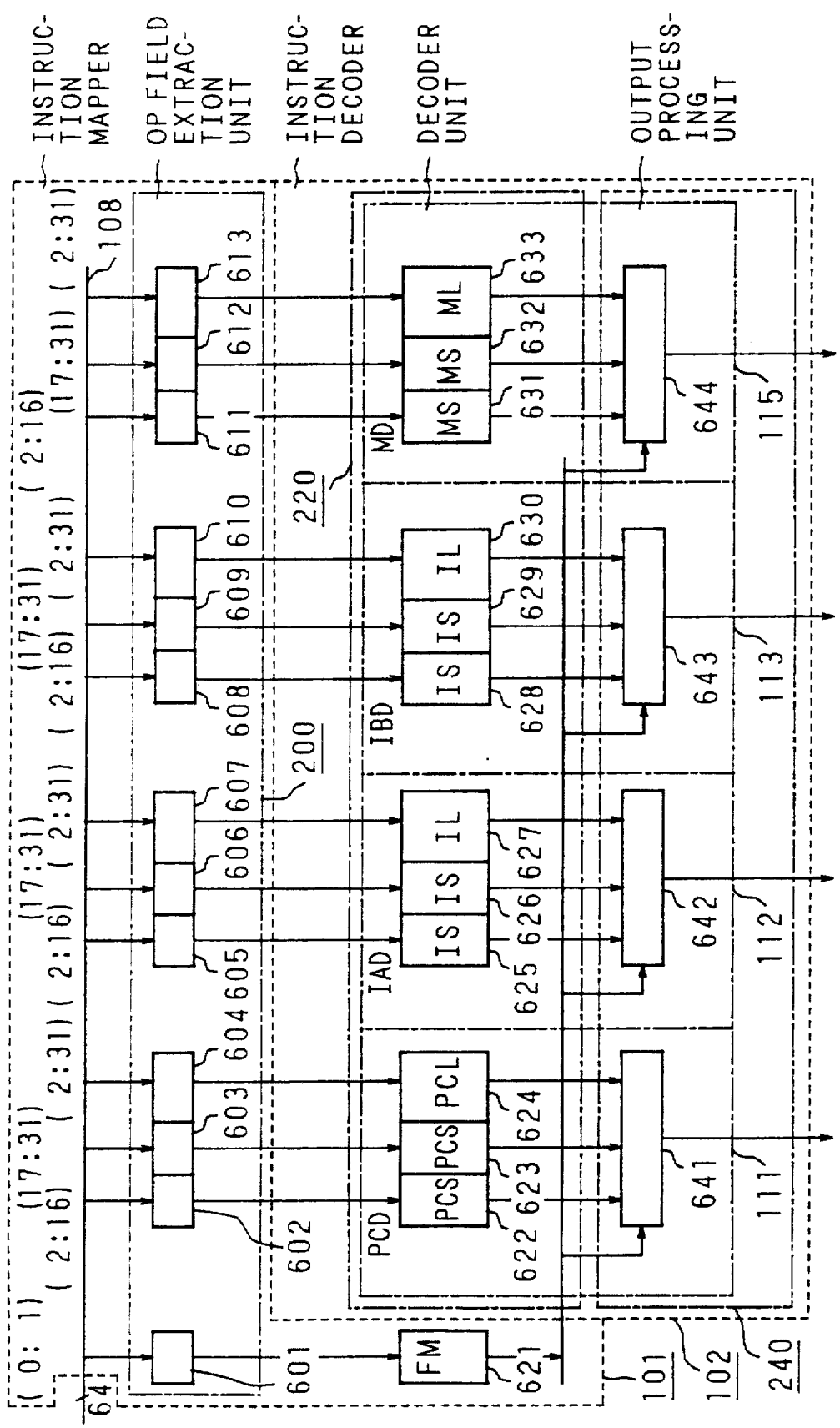
FIG. 24 is a block diagram showing an example of a configuration of an instruction mapper and an instruction decoder of the data processor according to the second embodiment of the present invention.

FIG. 24 is a block diagram showing a specific configuration of the instruction mapper 101 and the instruction decoder 102 which corresponds to the block diagram in FIG. 23.

The instruction mapper 101 is configured by: the operation field extraction unit 200 for extracting the format field 410 and the operation fields 411 to 413 from a 32-bit instruction code outputted to the II bus 108; and an FM decoder 621 for decoding the format field 410.

Each one of extraction units 601 to 613 of the operation field extraction unit 200 extracts some of bit fields of an instruction code on the II bus 108 and outputs a bit string of each operation field corresponding to each one of the decoders 111 to 113 and 115 configuring the instruction decoder 102. Of the thirty-two bits on the II bus 108, the extraction unit 601 extracts bit 0 to bit 1, the extraction unit 602 extracts bit 2 to bit 16, the extraction unit 603 extracts bit 17 to bit 31, the extraction unit 604 extracts bit 2 to bit 31, the extraction unit 605 extracts bit 2 to bit 16, the extraction unit 606 extracts bit 17 to bit 31, the extraction unit 607 extracts bit 2 to bit 31, the extraction unit 608 extracts bit 2 to bit 16, the extraction unit 609 extracts bit 17 to bit 31, the extraction unit 610 extracts bit 2 to bit 31, the extraction unit 611 extracts bit 2 to bit 16, the extraction unit 612 extracts bit 17 to bit 31, and the extraction unit 613 extracts bit 2 to bit 31. Extracted bits are outputted to the instruction decoder 102.

The instruction decoder 102 (PCi) 111, IAD 112, IBD 113, MD 115) is configured by the decoder unit 220 and the output processing unit 240. More specifically, the PCD 111 is configured by a PCS decoder 622 for decoding a jump operation code of the short format extracted by the extraction unit 602, a PCS decoder 623 for decoding a jump operation code of the short format extracted by the extraction unit 603, a PCL decoder 624 for decoding a jump operation code of the long format extracted by the extraction unit 604, and an output processing unit 641. To the control circuit 103, the output processing unit 641 outputs control signals Which instruct for executing a jump operation according to an output from the PCS decoder 622, 623 or the PCL decoder 624, a non-jump operation for adding "8" to a current PC value, or a null operation, in accordance with decoded results performed by the four decoders, i.e., the PCS decoders 622 and 623, the PCL decoder 624, and the FM decoder 621.

The IAD 112 is configured by an IS decoder 625 for decoding an integer operation code of the short format extracted by the extraction unit 605, an IS decoder 626 for decoding an integer operation code of the short format extracted by the extraction unit 606, an IL decoder 627 for decoding an integer operation code of the long format extracted by the extraction unit 607, and an output processing unit 642. To the control circuit 103, the output processing unit 642 outputs control signals which instruct for executing an integer operation according to an output from the IS decoder 625, 626 or the IL decoder 627, or a null operation, in accordance with decoded results performed by the four decoders, i.e., the IS decoders 625 and 626, the IL decoder 627, and the FM decoder 621.

The IBD 113 is configured by an IS decoder 628 for decoding an integer operation code of the short format extracted by the extraction unit 608, an IS decoder 629 for decoding an integer operation code of the short format extracted by the extraction unit 609, an IL decoder 630 for decoding an integer operation code of the long format extracted by the extraction unit 610 and an output processing unit 643. To the control circuit 103, the output processing unit 643 outputs control signals which instruct for executing an integer operation according to an output from the IS decoder 628, 629 or the IL decoder 630, or a null operation, in accordance with decoded results performed by the four decoders, i.e., the IS decoders 628 and 629, the IL decoder 630, and the FM decoder 621.

The MD 115 is configured by MS decoders 631 and 632 for decoding memory access operation codes of the short format extracted by the extraction units 611 and 612, an ML decoder 633 for decoding memory access operation codes of the long format extracted by the extraction unit 613, and an output processing unit 644. To the control circuit 103, the output processing unit 644 outputs control signals which instruct for executing a memory access operation according to an output from the MS decoder 631, 632 or the ML decoder 633, or a null operation, in accordance with decoded results performed by the four decoders, i.e., the MS decoders 631 and 632, the ML decoder 633, and the FM decoder 621.

Outputs from the output processing unit 640 (641 to 644) are inputted to the control circuit 103 and used to control an operation performed by the operation unit 104. More particularly, an output from the output processing unit 641 is used to control of a PC calculation performed by the PC unit 121. Outputs from the output processing units 642 and 643 are used to control integer operations performed by the integer operation mechanisms (IA, IB) 122 and 123 of the integer operation unit 120, respectively. An output from the output processing unit 644 is used to control a memory access operation performed by the memory access unit 125.

Figure 25:
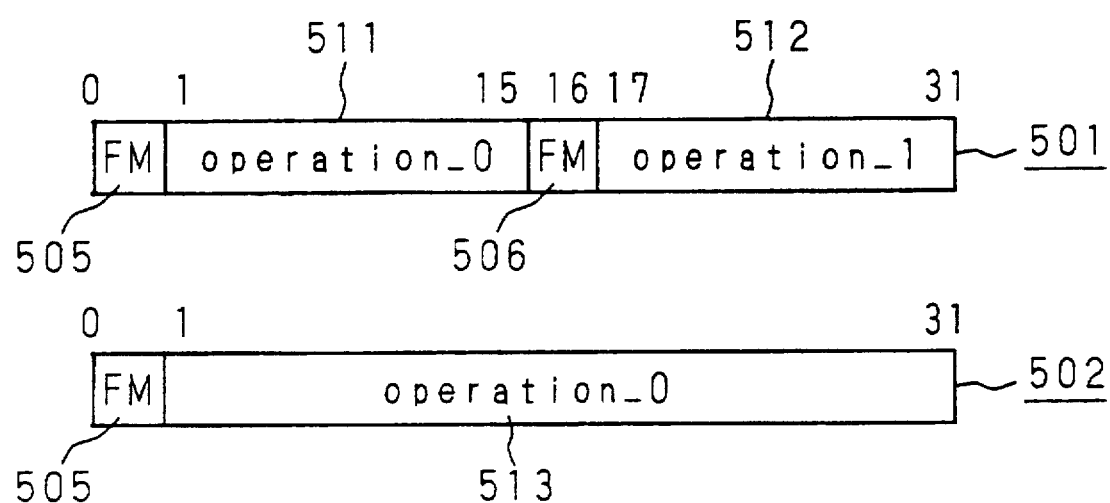
FIG. 25 is a schematic diagram showing an instruction format used in a data processor according to a third embodiment of the present invention.

FIG. 25 is a schematic diagram showing an instruction format used in a data processor according to a third embodiment of the present invention, in which one or two 1-bit format fields are used and one instruction includes one or two operation fields.

The third embodiment uses two types of instruction formats. Reference numeral 501 is a format of a 2-operation instruction which is formed of two format fields (FM) 505 and 506 each consisting of one bit, and two operation fields 511 and 512 each consisting of fifteen bits. Numeral 502 designates a format of a 1-operation instruction which is formed of one format field 505 consisting of one bit and one operation field 513 consisting of thirty-one bits. In the third embodiment, an instruction has a fixed length of four bytes (thirty-two bits). Both the 2-operation instruction of the format 501 and the 1-operation instruction of a format 502 shown in FIG. 25 each have a length of four bytes in total.

In the 2 operation instruction of the format 501, the two operation fields 511 and 512 each designate one operation code of a 15-bit short format. In the 1 operation instruction of the format 502, the one operation field 513 specifies one operation code of a 31-bit long format.

FIG. 26 is a list showing the contents of the format fields 505 and 506, that is, detailed values and meanings of the format fields 505 and 506. In the third embodiment, the format fields 505 and 506 each have a 1-bit configuration. Three types can be specified by total, i.e., two types can be specified for the instruction format 501 and one type can be specified for the instruction format 502. In the list, the symbols "1st", "2nd" and "---" express similar meanings as those used in the first and the second embodiments shown in FIG. 2 and FIG. 22 described earlier.

The format fields 505 and 506 in the instruction formats used in the third embodiment are obtained by reducing and dividing the format field 410 which is in the instruction formats used in the second embodiment described above. The format field (FM) of the 2-operation instruction format 501 is divided into two fields 505 and 506 in the third embodiment. As compared with the second embodiment, in the third embodiment, the number of combinations of the format of an instruction and the sequence of executing operations which can be specified by the format fields 505 and 506 is reduced to three from four. However, instead of this, the length of the operation field 513 of the instruction format 502 of the long type is increased from thirty bits to thirty-one bits, and in addition, the operation fields 511 and 512 of the instruction format 501 of the short type are allocated in such a manner that the operation fields 511 and 512 do not cross a 16-bit boundary between the bit 15 and the bit 16.

The hardware configuration of the third embodiment is similar to the hardware configuration of the second embodiment which is shown in FIG. 23.

Figure 27:
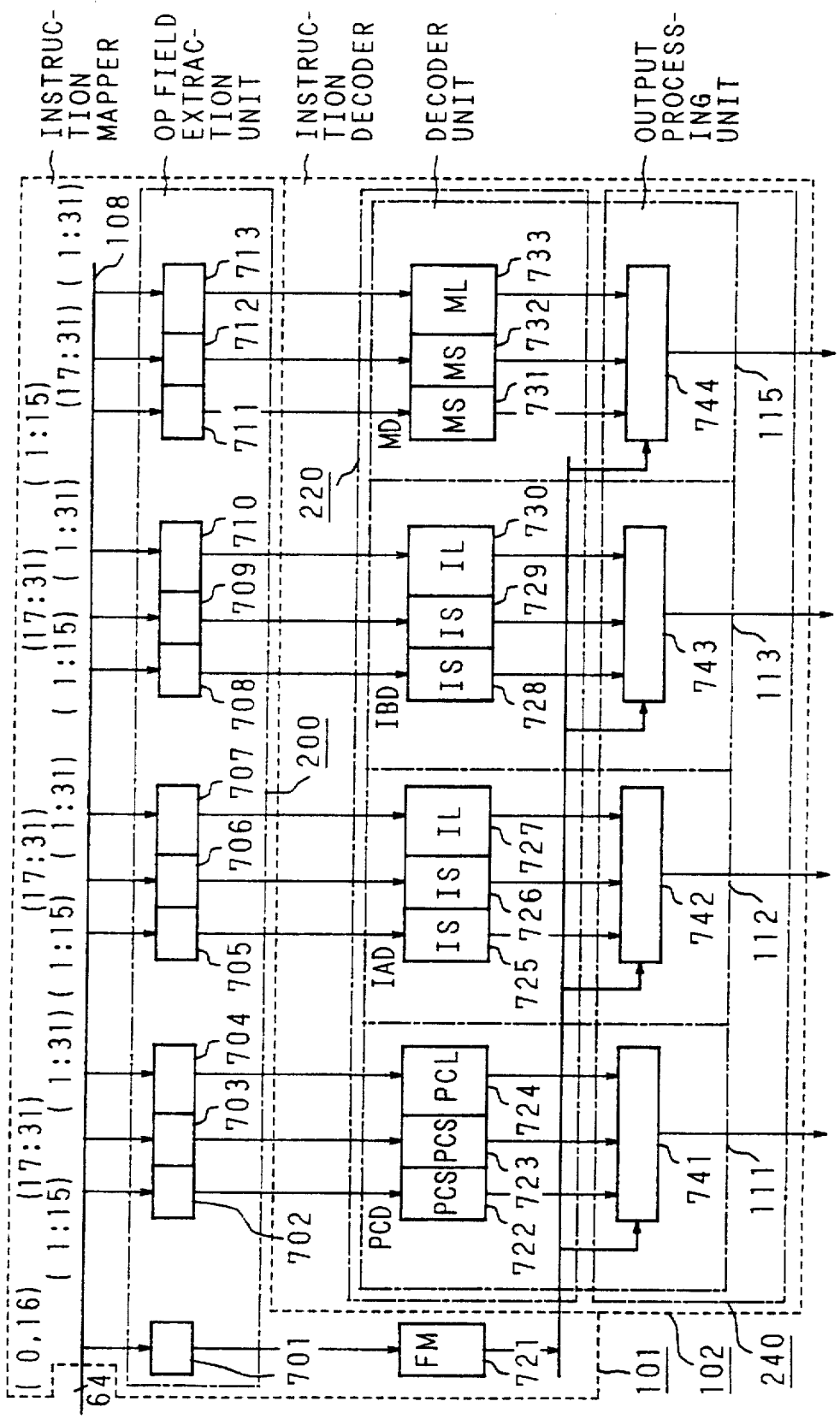
FIG. 27 is a blocks diagram showing an example of an overall configuration of the data processor according to the third embodiment of the present invention.

FIG. 27 is a block diagram showing an example of a specific configuration of the instruction mapper 101 and the instruction decoder 102 corresponding to the hardware configuration according to the third embodiment of the present invention.

The instruction mapper 101 is configured by: the operation field extraction unit 200 for extracting the format fields 505 and 506 and the operation fields 511 to 513 from a 32-bit instruction code outputted to the II bus 108; and an FM decoder 721 for decoding the format fields 505 and 506.

Each one of extraction units 701 to 713 of the operation field extraction unit 200 extracts some of bit fields of an instruction code on the II bus 108 and outputs a bit string of each operation field which corresponds to each one of the decoders 111 to 113 and 115 configuring the instruction decoder 102. Of the thirty-two bits on the II bus 108, the extraction unit 701 extracts bit 0 and bit 16, the extraction unit 702 extracts bit 1 to bit 15, the extraction unit 703 extracts bit 17 to bit 31, the extraction unit 704 extracts bit 1 to bit 31, the extraction unit 705 extracts bit 1 to bit 15, the extraction unit 706 extracts bit 17 to bit 31, the extraction unit 707 extracts bit 1 to bit 31, the extraction unit 708 extracts bit 1 to bit 15, the extraction unit 709 extracts bit 17 to bit 31, the extraction unit 710 extracts bit 1 to bit 31, the extraction unit 711 extracts bit 1 to bit 11, the extraction unit 712 extracts bit 17 to bit 31, and the extraction unit 713 extracts bit 1 to bit 31. Extracted bits are outputted to the instruction decoder 102.

The instruction decoder 102 (PCD 111, IAD 112, IBD 113, MD 115) is configured by the decoder unit 220 and the output processing unit 240. More specifically, the PCD 111 is configured by a PCS decoder 722 for decoding jump operation code of the short format extracted by the extraction unit 702, a PCS decoder 723 for decoding a jump operation code of the short format extracted by the extraction unit 703, a PCL decoder 724 for decoding a jump operation code of the long format extracted by the extraction unit 704, and an Output processing unit 741. To the control circuit 103, the output processing unit 741 outputs control signals which instruct for executing a jump operation according to an output from the PCS decoder 722, 723, or the PCL decoder 724, a non-jump operation for adding "8" to a current PC value, or a null operation, in accordance with decoded results performed by the four decoders, i.e., the PCS decoders 722 and 723, the PCL decoder 724, and the FM decoder 721.

The IAD 112 is configured by an IS decoder 725 for decoding an integer operation code of the short format extracted by the extraction unit 705, an IS decoder 726 for decoding an integer operation code of the short format extracted by the extraction unit 706, an IL decoder 727 for decoding an integer operation code of the long format extracted by the extraction unit 707, and an output processing unit 742. To the control circuit 103, the output processing unit 742 outputs control signals which instruct for executing an integer operation according to an output from the IS decoder 725, 726, or the IL decoder 727, or a null operation, in accordance with decoded results performed by the four decoders, i.e., the IS decoders 725 and 726, the IL decoder 727, and the FM decoder 721.

The IBD 113 is configured by an IS decoder 728 for decoding an integer operation code of the short format extracted by the extraction unit 708, an IS decoder 729 for decoding an integer operation code of the short format extracted by the extraction unit 709, an IL decoder 730 for decoding an integer operation code of the long format extracted by the extraction unit 710, and an output processing unit 743. To the control circuit 103, the output processing unit 743 outputs control signals which instruct for executing an integer operation according to an output from the IS decoder 728, 729, or the IL decoder 730, or a null operation, in accordance with results of decoding performed by the four decoders, i.e., the IS decoders 728 and 729, the IL decoder 730, and the FM decoder 721.

The MD 115 is configured by MS decoders 731 and 732 for decoding memory access operation codes of the short format extracted by the extraction units 711 and 712, an ML decoder 733 for decoding memory access operation codes of the long format extracted by the extraction unit 713, and an output processing unit 744. To the control circuit 103, the output processing unit 744 outputs control signals which instruct for executing a memory access operation according to an output from one of the MS decoders 731, 732, and the ML decoder 733 or a null operation, in accordance with results of decoding performed by the four decoders, i.e., the MS decoders 731 and 732, the ML decoder 733, and the FM decoder 721.

Outputs from the output processing unit 740 (741 to 744) are inputted to the control circuit 103 and used to control an operation performed by the operation unit 104. More particularly, an output from the output processing unit 741 is used to control a PC calculation performed by the PC unit 121. Outputs from the output processing units 742 and 743 are used to control integer operations performed by the integer operation mechanisms (IA, IB) 122 and 123 of the integer operation unit 120, respectively. An output from the output processing unit 744 is used to control a memory access operation performed by the memory access unit 125.

Each embodiment described above is related to a case where the types of operations arranged in operation fields are not limited as much as possible. However, as far as the types of operations which are arranged in operation fields may be limited, the data processor according to the present invention is realized with a hardware configuration being much simpler than that shown in FIG. 10.

For example, when the symmetry of operations which can be arranged in the operation fields 511 and 512 of the third embodiment is eliminated, and the format fields 505 and 506 are "01", operations are executed in parallel only when one of the operations is a null operation (i.e., there is no parallel operation in reality and parallel decoding alone is necessary) by limiting that a null operation only can be arranged in the operation field 512. Then the operation fields 511 and 512 are always decoded sequentially by one instruction decoder. The scale of the hardware can be reduced to approximately half that of a case where operations can be arranged in both operation fields 511 and 512.

A data processor according to the present invention comprises an instruction decoder for decoding an instruction and outputting control signals and a plurality of operating means, which are connected to the instruction decoder, for executing the instruction in accordance with the control signals. In the data processor, the instruction decoder outputs control signals for executing two operations while two operating means execute the operations when a 64-bit 2-operation instruction which consists of two operation fields and a format field is executed, for example, whereas the instruction decoder outputs control signals for executing three operations while three operating means execute the operations when a 64-bit 3-operation instruction which consists of three operation fields and a format field is executed, for example. Thus, in the data processor according to the present invention, by adjusting the number of operations which can be specified with one instruction while maintaining the length of instructions constant, an operation which includes a large quantity of necessary information, such as the register number and an immediate and in which operation codes are long, and an operation which includes a small quantity of the necessary information in which operation codes are short can be encoded into instruction codes having a fixed length. Hence, since processing for specifying an instruction length is not necessary and boundaries between instructions are always located at aligned address boundaries, instruction decoding becomes easy and a program can be described at an improved coding efficiency.

Further, a data processor according to the present invention comprises an instruction decoder for decoding an instruction and outputting control signals and a plurality of operating means, which are connected to the instruction decoder, for executing the instruction in accordance with the control signals. In the data processor, when a plural operation instruction consisting of two or three operation fields and a format field which specifies the number of operation fields and an order of executing operations specified by the operation fields is executed, for instance, the instruction decoder decodes a plural operation instruction and outputs two or three control signal groups in an order specified by the format field while two or three operating means execute operations specified by the respective control signal group. Thus, in the data processor according to the present invention, it is possible to change the number of operations which can be encoded with one instruction and the order of execution of encoded operations. Hence, a program can be described at an improved coding efficiency, using a fixed length plural operation instruction which determine the order of execution of the operations without using useless null operations.

Further, a data processor according to the present invention comprises an instruction decoder for decoding an instruction and outputting control signals and a plurality of operating means, which are connected to the instruction decoder, for executing the instruction in accordance with the control signals. In the data processor, when a plural operation instruction consisting of two or three operation fields and a format field which specifies the number of operation fields and an order of execution of operations specified by the operation fields is executed, for instance, the instruction decoder decodes a plural operation instruction and outputs two or three control signal groups in an order specified by the format field while two or three operating means sequentially execute operations specified by the respective control signal group, or when a plurality of operation instruction consisting of two or three operation fields and a format field which specifies the number of operation fields and simultaneous execution of operations specified by the operation fields is executed, the instruction decoder decodes a plural operation instruction and concurrently outputs two or three control signal groups while two or three operating means simultaneously execute operations specified by the control signal groups. Thus, it is possible to specify the number of operations which can be encoded with one instruction and to specify whether to simultaneously execute encoded operations or to sequentially execute encoded operations in the data processor according to the present invention. Hence, when operations which can be simultaneously executed in response to a fixed length plural operation instruction are simultaneously encoded and executed at high speed while operations which need be arranged in an order are encoded without using useless null operations at better coding efficiency and sequentially executed, a compact, high-speed program can be described.

Further, a data processor according to the present invention comprises an integer operation decoder for decoding a first operation field of an instruction and outputting control signals regarding an integer operation, an integer operation execution unit which is connected to the decoder to operate in accordance with the control signals regarding the integer operation, a memory access operation decoder for decoding the same operation field of the instruction and outputting control signals regarding memory accessing, and a memory access unit which is connected to the decoder to operate in accordance with the control signals regarding the memory accessing. In the data processor, when an instruction which specifies an integer addition by an operation field is processed, both the integer operation decoder and the memory access operation decoder decode the operation fields which specify the integer addition at the same time, the integer operation decoder outputs the control signals regarding the integer operation, the memory access operation decoder outputs the control signals regarding a null operation, the integer operation execution unit executes the integer addition and the memory access unit does not execute a valid memory access operation. When an instruction which specifies a load operation of loading data into a register from a memory in an operation field is processed, both the integer operation decoder and the memory access operation decoder decode the operation field which specifies the load operation simultaneously, the integer operation decoder outputs the control signals regarding a null operation, the memory access operation decoder outputs the control signals regarding a load operation, and the memory access unit executes the load operation. Thus, in the data processor according to the present invention, since one of two different operation execution units executes a valid operation for one operation field specified by the instruction while the other one of the two different operation units does not execute a valid operation, the two types of the operation execution units each operates in accordance with the control signal outputted from the exclusive decoder to process the instruction, depending on the type of the operation. Hence, the wiring of control signals connecting the decoders and the operation execution units becomes simple, thereby making it easy to design the circuit configuration. Further, each decoder has a simple function and can decode at high speed.

Further, a data processor according to the present invention comprises a first decoder for decoding a first operation field of an instruction and outputting a first control signal, a second decoder for decoding a second operation field and outputting a second control signal, an output processing unit which is connected to the first and the second decoders to receive both the first and the second control signals and selectively outputs one of the first and the second control signals, and a memory access unit which is connected to the output processing unit to operate in accordance with the control signal which is outputted from the output processing unit. In order to process a first instruction in which a load operation of loading data from a memory is specified by a first operation field and an addition of integers is specified by a second operation field, for instance, the first and the second decoders decode the first and the second operation fields at the same time, the first decoder outputs a control signal regarding the load operation, the second decoder outputs a control signal regarding a null operation, the output processing unit selectively outputs the control signal regarding the load operation to the memory access unit, the memory access unit executes the load operation, and in order to process a second instruction in which a right shift operation is specified by the first operation field and a load operation is specified by the second operation field, the first and the second decoders decode the first and the second operation fields in parallel, the first decoder outputs the control signal regarding a null operation, the second decoder outputs the control signal regarding the load operation, the output processing unit selectively outputs the control signal regarding the load operation to the memory access unit, the memory access unit executes the load operation. Thus, in the data processor according to the present invention, the plurality of decoders decode operation fields in parallel regardless of which one of a plurality of operation fields included in an instruction specifies an operation, the output processing unit eliminates a null operation from a result of the decoding and selectively outputs a valid operation to the operation units, and the same operation execution unit executes the specified operation. Hence, a data processor which executes an operation specified by operation fields whose number is larger than that of the operation execution units at high speed can be realized at an inexpensive cost.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

TABLE 1

| | MNEMONIC | FUNCTION | FORMAT | TYPE |
|---|---|---|---|---|
| 1 | MOV Rm,Rd | Copy word from a reg. to another reg. | SR | Integer |
| 2 | CMP/f Rm,Rn | Compare general | SR | Integer |
| 3 | CMPI/f exp,Rm | Compare general immediate | SI | Integer |
| 4 | ADD Rm,Rd | Add | SR | Integer |
| 5 | ADDI exp,Rd | Add immediate | SI | Integer |
| 6 | MUL Rm,Rd | Multiply | SR | Integer |
| 7 | SUB Rm,Rd | Subtract | SR | Integer |
| 8 | SHLI exp,Rd | Shift left immediate | SI | Integer |
| 9 | SHRAI exp,Rd | Shift right arithmetic immediate | SI | Integer |
| 10 | SHRLI exp,Rd | Shift right logical immediate | SI | Integer |
| 11 | SHVL Rm,Rd | Shift logical | SR | Integer |
| 12 | AND Rm,Rd | Logical AND | SR | Integer |
| 13 | NOT Rm,Rd | Logical NOT | SR | Integer |
| 14 | OR Rm,Rd | Logical OR | SR | Integer |
| 15 | XOR Rm,Rd | Logical exclusive OR | SR | Integer |
| 16 | BCLR Rm,Rd | Clear a bit | SR | Integer |
| 17 | BCLRI exp,Rd | Clear a bit immediate | SI | Integer |
| 18 | BNOT Rm,Rd | Invert a bit | SR | Integer |
| 19 | BNOTI exp,Rd | Invert a bit immediate | SI | Integer |
| 20 | BSET Rm,Rd | Set a bit | SR | Integer |
| 21 | BSETI exp,Rd | Set a bit | SI | Integer |
| 22 | BTST Rm,Rn | Test a bit | SR | Integer |
| 23 | BTSTI exp,Rn | Test a bit | SI | Integer |
| 24 | FMOV FRm,FRd | Copy data from a floating-point reg. to another floating-point reg. | SR | FP |

TABLE 2

| | MNEMONIC | FUNCTION | FORMAT | TYPE |
|---|---|---|---|---|
| 1 | LDB src,Rd | Load one byte to a reg. with extension | SM, LM | Memory |
| 2 | LDBU src,Rd | Load one byte to a reg. with zero extension | SM, LM | Memory |
| 3 | LDH src,Rd | Load one halfword to a reg. with sign extension | SM, LM | Memory |
| 4 | LDHU src,Rd | Load one halfword to a reg. with zero extension | SM, LM | Memory |
| 5 | LDI exp,Rd | Load immediate with sign extension | SI, LI | Integer |
| 6 | LDIU src,Rd | Load immediate with zero extension | SI, LI | Integer |
| 7 | LDW src,Rd | Load one word to a reg. | SM, LM | Memory |
| 8 | LDW2 src,Rd | Load two words to registers | SM, LM | Memory |
| 9 | STB Rm,dest | Store one byte from a reg. | SM, LM | Memory |
| 10 | STH Rm,dest | Store one halfword from a reg. | SM, LM | Memory |
| 11 | STW Rm,dest | Store one word from a reg. | SM, LM | Memory |
| 12 | STW4 Rm,dest | Store four words from registers | SM, LM | Memory |
| 13 | BRA pcdisp | Branch (PC-relative) | SB, LB | PC |
| 14 | BSR pcdisp | Branch to subroutine (PC-relative) | SB, LB | PC |
| 15 | JMP pcadr | Jump | SM, LM | PC |
| 16 | JSR pcadr | Jump to subroutine | SM, LM | PC |
| 17 | NOP | NO operation | SB, LB | Integer |
| 18 | FLD/s src,FRd | Load data to a floating-point reg. | SM, LM | Memory |
| 19 | FST/s FRm,dest | Store data from a floating-point reg. | SM, LM | Memory |

TABLE 3

| | MNEMONIC | FUNCTION | FORMAT | TYPE |
|---|---|---|---|---|
| 1 | IFG | Initialize flags | MISC | Integer |
| 2 | LDILH src,Rd | Load immediate to lower halfword | LI | Integer |
| 3 | LDIUH src,Rd | Load immediate to upper halfword | LI | Memory |
| 4 | LDW3 src,Rd | Load three words to registers | LM | Memory |
| 5 | LDW4 src,Rd | Load four words to registers | LM | Memory |
| 6 | MFFG Rd | Move from flags | MISC | Integer |
| 7 | MTFG Rm | Move to flags | MISC | Integer |
| 8 | STW2 Rm,dest | Store two words from registers | LM | Memory |
| 9 | STW3 Rm,dest | Store three words from registers | LM | Memory |
| 10 | CAcc/c Rm, Rn,Fs,Fd | Compare and logical AND | LR | Integer |
| 11 | CAIcc/c exp, Rm,Fs,Fd | Compare immediate and logical AND | LI | Integer |
| 12 | Ccc Rm,Rn,Fd | Compare | LR | Integer |
| 13 | CIcc exp,Rm,Fd | Compare immediate | LI | Integer |
| 14 | CSTRcc Rm, Rn,Fd | Compare byte strings | LR | Integer |
| 15 | CUAcc/c Rm, Rn,Fs,Fd | Compare unsigned and logical AND | LR | Integer |
| 16 | CUAIcc/c exp, Rm,Fs,Fd | Compare immediate unsigned and logical AND | LI | Integer |
| 17 | CUcc Rm,Rn,Fd | Compare unsigned | LR | Integer |
| 18 | CUIcc exp, Rm,Fd | Compare immediate unsigned | LI | Integer |
| 19 | ADD3 Rm,Rn,Rd | Add with three operands | LR | Integer |
| 20 | ADDI3 exp, Rm,Rd | Add immediate with three operands | LI | Integer |
| 21 | ADDX Rm,Rn,Rd | Add with carry | LR | Integer |
| 22 | DIV Rm,Rn,Rd | Divide | LR | Integer |
| 23 | MAD Rk, Rm,Rn,Rd | Multiply and add | LR | Integer |
| 24 | MULUX Rm, Rn,Rd | Multiply unsigned with extended precision | LR | Integer |
| 25 | REM Rm,Rn,Rd | Get remainder and quotient | LR | Integer |
| 26 | SUB3 Rm,Rn,Rd | Subtract with three operands | LR | Integer |
| 27 | SUBI3 exp, Rm,Rd | Subtract immediate with three operands | LI | Integer |
| 28 | SUBX Rm,Rn,Rd | Subtract with borrow | LR | Integer |
| 29 | ROT3 Rm,Rn,Rd | Rotate with three operands | LR | Integer |
| 30 | ROTI3 exp, Rm,Rd | Rotate immediate with three operands | LI | Integer |
| 31 | SHVAI3 exp, Rm,Rd | Shift arithmetic immediate with three operands | LI | Integer |
| 32 | SHVC Rm,Rn,Rd | Shift concatenated registers | LR | Integer |
| 33 | SHVC4 Rm,Rn,Rd | Shift concatenated four registers | LR | Integer |
| 34 | SHVL3 Rm,Rn,Rd | Shift logical with three operands | LR | Integer |
| 35 | SHVLI3 exp, Rm,Rd | Shift logical immediate with three operands | LI | Integer |
| 36 | ANDI3 exp, Rm,Rd | Logical AND immediate | LI | Integer |
| 37 | ORI3 exp,Rm,Rd | Logical OR immediate | LI | Integer |
| 38 | XORI3 exp, Rm,Rd | Logical exclusive OR immediate | LI | Integer |
| 39 | BSCH/b Rm, Rn,Rd | Search for a bit | MISC | Integer |
| 40 | LDCTX Rd | Load a context | MISC | Memory |
| 41 | MFC CRm,Rd | Move from a control reg. | MISC | Integer |
| 42 | MTC Rm,CRd | Move to a control reg. | MISC | Integer |
| 43 | REIT | Return from EIT | MISC | PC |
| 44 | STCTX Rm | Store the current | MISC | Memory |

TABLE 3-continued

| MNEMONIC | FUNCTION | FORMAT | TYPE |
|---|---|---|---|
| | context | | |
| 45 TRAP vector | Trap | MISC | PC |
| 46 WAIT imask | Set an interrupt mask and wait | MISC | Integer |
| 47 SCMP Rs1,Rs2, Rc,Fd | Compare strings | MISC | Memory |
| 48 SMOV Rs,Rd, Rc,Fd | Move a string | MISC | Memory |
| 49 SSCH Rs,Rc Rm,Ru,Fd | Search for an element in a string | MISC | Memory |
| 50 SSTR Rs,Rc, Ru,Fd | Fill a string with an element | MISC | Memory |
| 51 BVMAP Rsb,Rso, Rdb,Rdo,Rp,Rw, Rh,Rtw | Manipulate bit fields | MISC | Memory |
| 52 BVPAT Rs,Rdb, Rdo,Rp,Rw,Rh,Rtw | Manipulate bit fields | MISC | Memory |
| 53 BVSCH/b Rm,Rn, Rd | Search for a bit in a bit field | MISC | Memory |
| 54 FLD2/s src, FRd | Load two data to floating point registers | LM | Memory |
| 55 FLD3/s src, FRd | Load three data to floating point registers | LM | Memory |
| 56 FLD4/s src, FRd | Load four data to floating point registers | LM | Memory |
| 57 FST2/s FRm, dest | Store two data from floating point registers | LM | Memory |
| 58 FST3/s FRm, dest | Store three data from floating-point registers | LM | Memory |
| 59 FST4/s FRm, dest | Store four data from floating-point registers | LM | Memory |
| 60 FCAcc/c/s FRm, FRn,Fs,Fd | Compare real and logical AND | LR | FP |
| 61 FCcc/s FRm, FRn,Fd | Compare real | LR | FP |
| 62 FABS/f/s FRm,FRd | Negate real | LR | FP |
| 63 FADD/f/s FRm, FRn,FRd | Add real | LR | FP |
| 64 FCDTS/f FRm, FRd | Convert double to single | LR | FP |
| 65 FCFI/f/s Rm, FRd | Convert a signed data from integer to floating point | LR | FP |
| 66 FCFIU/f/s Rm, FRd | Convert an unsigned data from integer to floating-point | LR | FP |
| 67 FCSTD/f FRm, FRd | Convert single to double | LR | FP |
| 68 FCTI/f/s FRm, Rd | Convert a signed data from floating-point to integer | LR | FP |
| 69 FCTIU/f/s FRm, Rd | Convert an unsigned data from floating-point to integer | LR | FP |
| 70 FDIV/f/s FRm, FRn,FRd | Divide real | LR | FP |
| 71 FMAD/f/s FRk, FRm,FRn,FRd | Multiply and add real | LR | FP |
| 72 FMUL/f/s FRm, FRn,FRd | Multiply real | LR | FP |
| 73 FNEG/f/s FRm, FRd | Negate real | LR | FP |
| 74 FSUB/f/s FRm, FRn,FRd | Subtract real | LR | FP |

What is claimed is:

1. A data processor, comprising:

an instruction decoder for decoding an instruction code and outputting a control signal, said instruction code consisting of at least one operation field which specifies the type of an operation to be executed and a format field which specifies the number of said operation fields; and a plurality of operating means, connected to said instruction decoder, for executing the operation in accordance with the control signal outputted from said instruction decoder;

wherein when said instruction decoder decodes a first instruction code including a first number of operation fields, said instruction decoder outputs a first control signal, and said plurality of operating means execute said first number of operations in accordance with said first control signal, and when said instruction decoder decodes a second instruction code including a second number of operation fields and having the same code length as said first instruction code, said second number being different from said first number, said instruction decoder outputs a second control signal different from said first control signal, said plurality of operating means execute said second number of operations in accordance with said second control signal.

2. A data processor comprising:

an instruction decoder for decoding an instruction code;

a control unit, connected to said instruction decoder for outputting a control signal in accordance with a decoded result by said instruction decoder; and first operating means and second operating means, connected to said control unit, for executing an instruction in accordance with the control signal outputted from said control unit;

wherein when said instruction decoder decodes an instruction code consisting of at least a first operation field and a second operation field, each specifying a type of an operation to be executed, and a format field specifying the number of operation fields and an order of execution of operations specified by the operation fields, said control unit outputs a first control signal and a second control signal depending on operation types specified by said first operation field and said second operation field, respectively, and in accordance with the order of execution of operations specified by said format field, said first operating means executes a first operation in accordance with said first control signal, and said second operating means executes a second operation in accordance with said second control signal.

3. The data processor as set forth in claim 2, wherein when said instruction decoder decodes a first instruction code in which sequential execution of the first operation specified by said first operation field and the second operation specified by said second operation field is specified by said format field, said instruction decoder outputs a first decoded result while said control unit outputs the first control signal at a first time point in accordance with said first decoded result and then outputs the second control signal at a second time point in accordance with said first decoded result, so that said first operating means executes said first operation in accordance with said first control signal and said second operating means thereafter executes said second operation in accordance with said second control signal, and when said instruction decoder decodes a second instruction code in which simultaneous execution of a third operation specified by said first operation field and a fourth operation specified by said second operation field is specified by said format field, said instruction decoder outputs a second decoded result while said control unit outputs a third control signal and a fourth control signal at the same time in accordance with said second decoded result, so that said first operating means and said second operating means simultaneously execute said third operation and said fourth operation in accordance with said third control signal and said fourth control signal, respectively.

4. A data processor, comprising:

a first decoder for decoding a predetermined field of an instruction code and outputting a control signal;

a first operation execution unit which is connected to said first decoder, and operates in accordance with the control signal outputted from said first decoder;

a second decoder for decoding said predetermined field and outputting a control signal; and second operation execution unit which is connected to said second decoder, and operates in accordance with the control signal outputted from said second decoder;

wherein when a first instruction code in which a first type of operation specified by said predetermined field is decoded, said first and said second decoders decode said predetermined field at the same time, and said first decoder outputs a first control signal while said second decoder outputs a second control signal which is different from said first control signal, said first operation execution unit executes a first operation in accordance with said first control signal, and said second operation execution unit executes no operation in accordance with said second control signal, and when a second instruction code in which a second type of operation specified by said predetermined field is decoded, said first and said second decoders decode said predetermined field at the same time, and said first decoder outputs a third control signal while said second decoder outputs a fourth control signal which is different from said third control signal, and said first operation execution unit executes no operation in accordance with said third control signal, and said second operation execution unit executes a second operation in accordance with said fourth control signal.

5. A data processor, comprising:

a first decoder for decoding a first operation field of an instruction code and outputting a first control signal;

a second decoder for decoding a second operation field of an instruction code which is different from said first operation field and outputting a second control signal;

an output processing unit connected to said first and said second decoders, for inputting both said first and said second control signals and selectively outputting one of said first and said second control signals; and an operation execution unit which is connected to said output processing unit, and operates in accordance with a control signal outputted from said output processing unit;

wherein when a first instruction code in which a first operation is specified by said first operation field and a second operation is specified by said second operation field is decoded, said first decoder decodes said first operation field and said second decoder decodes said second operation field at the same time, said first decoder outputs the first control signal and said second decoder outputs the second control signal, and said output processing unit selectively outputs said first control signal to said operation execution unit, and when a second instruction code in which a third operation is specified by said first operation field and said first operation is specified by said second operation field, said first decoder decodes said first operation field and said second decoder decodes said second operation field at the same time, said first decoder outputs a third control signal and said second decoder outputs a fourth control signal, and said output processing unit selectively outputs said fourth control signal to said operation execution unit, whereby said operation execution unit executes said first operation both when said first operation is specified by said first operation field and when said first operation is specified by said second operation field.

6. A data processor, comprising:

an instruction decoder for decoding an instruction consisting of a first, a second, and a third operation code field which respectively specify operations, and an execution order specifying field which specifies an execution order of executing operations specified by each of said three operation code fields and outputting a decoded result;

an operation execution unit, connected to said instruction decoder and controlled on the basis of the decoded result which is output from said instruction decoder, for executing the operations specified respectively by said first, said second and said third operation code field in accordance with the execution order specified by said execution order specifying field;

wherein said instruction decoder outputs the first decoded result in response to a value of said execution order specifying field being classified as a first value, and wherein according to said first decoded result, in a first cycle said operation execution unit executes the operations specified respectively by said first and said second operation code field in parallel, and then in a second cycle having continuity with the first cycle, the operation specified by said third operation code field is executed.

7. The data processor as set forth in claim 6, wherein said instruction decoder outputs a second decoded result in response to a value of said execution order specifying field being classified as a second value, which is different from said first value, and wherein according to said second decoded result said operation execution unit executes the operations specified respectively by said first, said second and said third operation code field in parallel.

8. The data processor as set forth in claim 6, wherein said instruction decoder outputs a third decoded result in response to a value of said execution order specifying field being classified as a third value, which is different from said first value, and wherein according to said third decoded result said operation execution unit executes sequentially, in a predetermined order, the operations specified respectively by said first, said second and said third operation code field.

9. The data processor as set forth in claim 8.

wherein said operation execution unit has a plural operation unit for executing operations and, at least two of said first, said second and said third operation code field are executed in a common execution unit of said plural operation unit.

10. The data processor as set forth in claim 6, wherein said operation execution unit comprises first and second operation units for executing operations.

in the first cycle, said first operation unit executes the operation specified by said first operation code field and said second operation unit executes the operation specified by said second operation code field in parallel with execution by said first operation unit, and in the second cycle, the operation specified by said third operation code field is executed in said first operation unit.

11. The data processor as set forth in claim 6, wherein said instruction decoder is structured to decode said first, said second and said third operation code fields, wherein said instruction decoder comprises a first, a second and a third decode unit for outputting a first, a second and a third control signal as decoded results and a fourth decode unit for decoding the execution order specifying field, wherein said instruction decoder controls the timing of outputting said first, said second and said third control signals from said instruction decoder according to a fourth control signal outputted from said fourth decode unit, and wherein said operation execution unit executes the operations specified respectively by said first, said second and said third operation code field in accordance with said first, said second and said third control signal outputted from said instruction decoder.

12. The data processor as set forth in claim 6, wherein said instruction has a first, a second and a third fixed field, each of which has the same length as each other and information for executing each instruction, and said first, said second, and said third operation field are located in said first, said second and said third fixed field respectively.

13. The data processor as set forth in claim 6, wherein said instructions further comprises:

a first condition specifying field for specifying an execution condition of operations specified by said first operation code field, a second condition specifying field for specifying an execution condition of operations specified by said second operation code field, and a third condition specifying field for specifying an execution condition of operations specified by said third operation code field; and wherein operations are valid when an execution condition specified by the execution condition field is true.

14. A data processor, comprising:

an instruction decoder for decoding an instruction having:

a plurality of operation code fields each of which specifies operations;

a plurality of condition specifying fields, which are provided to correspond to respective ones of said plurality of operation code fields, for respectively specifying an execution condition of operations specified by corresponding operation code fields; and an execution order specifying field for specifying whether at least two operations, specified by each of said plurality of operation fields, are executed in parallel or sequentially; and an execution unit, connected to said instruction decoder and controlled in accordance with a decoded result which is outputted from said instruction decoder, for executing each of the operations specified by said plurality of operation code fields in accordance with the execution order specified by said execution order specifying field; and wherein said instruction decode unit controls said instruction execution unit to make operations are valid when an execution condition specified by the execution condition field is true.

15. The data processor as set forth in claim 14.

wherein, of the operations specified by said plurality of operation code fields, said instruction execution unit stores only an executed result to a store destination operand, which meets the execution conditions of the operations specified by said plurality of operation code fields.

16. The data processor as set forth in claim 15, wherein said store destination operand is a register a region of a memory, or a flag.

17. The data processor as set forth in claim 14, having:

at least one information holding unit for having information to be referred, when said instruction is executed, wherein each of the plurality of condition specifying fields specifies one of said information holding units, the operation specified respectively by said plurality of operation code specifying fields is judged to be invalid or valid in accordance with whether or not the contents held in the information holding unit specified by said corresponding condition specifying field is a predetermined value.

18. The data processor as set forth in claim 14, each of said plurality of condition specifying fields specifies the condition, which unconditionally makes the operation specified in said corresponding operation code field valid.

* * * * *